US010876198B2

(12) United States Patent
McDermott et al.

(10) Patent No.: US 10,876,198 B2
(45) Date of Patent: Dec. 29, 2020

(54) METHODS AND SYSTEMS FOR SLURRY COATING

(71) Applicant: Arcanum Alloys, Inc., Kentwood, MI (US)

(72) Inventors: Joseph E. McDermott, Sunnyvale, CA (US); Adam G. Thomas, Sunnyvale, CA (US); Zachary M. Detweiler, Sunnyvale, CA (US)

(73) Assignee: ARCANUM ALLOYS, INC., Kentwood, MI (US)

( * ) Notice: Subject to any disclaimer, the term of this patent is extended or adjusted under 35 U.S.C. 154(b) by 0 days.

(21) Appl. No.: 15/673,107

(22) Filed: Aug. 9, 2017

(65) Prior Publication Data
US 2018/0023180 A1    Jan. 25, 2018

Related U.S. Application Data

(63) Continuation of application No. PCT/US2016/017155, filed on Feb. 9, 2016.

(60) Provisional application No. 62/232,161, filed on Sep. 24, 2015, provisional application No. 62/114,560, filed on Feb. 10, 2015.

(51) Int. Cl.
C23C 10/20 (2006.01)
B32B 15/18 (2006.01)
B32B 15/01 (2006.01)

(52) U.S. Cl.
CPC ............ *C23C 10/20* (2013.01); *B32B 15/011* (2013.01); *B32B 15/012* (2013.01); *B32B 15/015* (2013.01); *B32B 15/18* (2013.01); *Y10T 428/12757* (2015.01); *Y10T 428/12861* (2015.01); *Y10T 428/12924* (2015.01); *Y10T 428/12965* (2015.01); *Y10T 428/12972* (2015.01)

(58) Field of Classification Search
None
See application file for complete search history.

(56) References Cited

U.S. PATENT DOCUMENTS

| | | |
|---|---|---|
| 2,044,742 A | 6/1936 | Armstrong et al. |
| 2,402,834 A | 6/1946 | Nachtman |
| 2,749,029 A | 6/1956 | Goetzel et al. |
| 2,794,630 A | 6/1957 | Turner, Jr. |
| 2,836,513 A | 5/1958 | Samuel |
| 2,859,158 A | 11/1958 | Schaer |
| 3,066,403 A | 12/1962 | Brauchler |
| 3,165,823 A | 1/1965 | Rowady |
| 3,184,331 A | 5/1965 | Carter |
| 3,222,212 A | 12/1965 | Samuel et al. |
| 3,294,498 A | 12/1966 | Carter |
| 3,312,546 A | 4/1967 | Mayer et al. |
| 3,403,988 A | 10/1968 | Carter |
| 3,414,428 A | 12/1968 | Kelly et al. |
| 3,604,102 A | 9/1971 | Boccalari et al. |
| 3,615,902 A | 10/1971 | Lesney |
| 3,642,517 A | 2/1972 | Faber |
| 3,728,149 A * | 4/1973 | Forand, Jr. .............. C23C 10/02 427/178 |
| 3,753,704 A | 8/1973 | Manilla et al. |
| 3,753,758 A | 8/1973 | Shanley |
| 3,762,884 A | 10/1973 | Grisaffe et al. |
| 3,768,987 A | 10/1973 | Forstmann et al. |
| 3,775,151 A | 11/1973 | Baker et al. |
| 3,879,270 A | 4/1975 | Kowalski |
| 3,902,892 A | 9/1975 | Easwaran et al. |
| 3,935,034 A | 1/1976 | Hayes et al. |
| 3,951,759 A | 4/1976 | Studer |
| 3,959,089 A | 5/1976 | Watts |
| 3,998,603 A | 12/1976 | Rairden, III |
| 4,092,226 A | 5/1978 | Laing et al. |
| 4,119,701 A | 10/1978 | Fedor et al. |
| 4,162,758 A | 7/1979 | Mikarai |
| 4,319,121 A | 3/1982 | Yoshida |
| 4,485,148 A | 11/1984 | Rashid et al. |
| 4,500,364 A | 2/1985 | Krutenat et al. |
| 4,526,148 A | 7/1985 | Narasaka et al. |
| 4,526,817 A | 7/1985 | Rausch et al. |
| 4,542,846 A | 9/1985 | Matsui et al. |
| 4,610,772 A | 9/1986 | Palnik |
| 4,835,010 A * | 5/1989 | Krutenat ................. C23C 10/50 427/250 |

(Continued)

FOREIGN PATENT DOCUMENTS

| | | |
|---|---|---|
| CA | 1170838 A | 7/1984 |
| CN | 1060116 A | 4/1992 |

(Continued)

OTHER PUBLICATIONS

Abstract for CN201850703, Jun. 2011.
Abstract for CN202381968, Aug. 2012.
American Galvanizers Association, "The HDG Coating," available at: galvanizeit.org/about-hot-dip-galvanizing/what-is-hot-dip-galvanizing/the-hdg-coating (retrieved Aug. 12, 2013).
Bramfitt, B. L. "ASM Handbooks Online." Heat Treating vol. 4. ASM International, 1991. Web. Jul. 24, 2013.<http://products.asminternational.org/hbk/index.jsp>.<http:></http:>.
Braun, et al. Diffusion of chromium in alpha-iron. Phys. Stat. Sol. (a), 1985, pp. 553-561, vol. 90/2.
Castle, et al. Chromium diffusion coatings. International Materials Review, 1999, 44(2): 37-59; ASM International, USA.

(Continued)

*Primary Examiner* — Adam Krupicka
(74) *Attorney, Agent, or Firm* — Wilson Sonsini Goodrich & Rosati

(57) ABSTRACT

The present disclosure provides systems and methods that employ slurries to form layers adjacent to substrates. Such layers can include, for example, one or more of iron, chromium, nickel, silicon, vanadium, titanium, boron, tungsten, aluminum, molybdenum, cobalt, manganese, zirconium, and niobium, oxides thereof, nitrides thereof, sulfides thereof, or combinations thereof. In some examples, such layers are stainless steel layers.

17 Claims, 28 Drawing Sheets

(56) References Cited

U.S. PATENT DOCUMENTS

| | | | |
|---|---|---|---|
| 4,904,501 A * | 2/1990 | Davis | C23C 10/20 427/253 |
| 4,917,969 A | 4/1990 | Pircher et al. | |
| 5,015,535 A | 5/1991 | Marquez et al. | |
| 5,024,735 A | 6/1991 | Kadija | |
| 5,167,791 A | 12/1992 | Herbert et al. | |
| 5,366,765 A | 11/1994 | Milaniak et al. | |
| 5,413,646 A | 5/1995 | Dash et al. | |
| 5,833,838 A | 11/1998 | Heyse et al. | |
| 5,879,532 A | 3/1999 | Foster et al. | |
| 5,997,815 A | 12/1999 | Anders et al. | |
| 6,004,684 A | 12/1999 | Sugg et al. | |
| 6,087,019 A | 7/2000 | Isobe et al. | |
| 6,110,262 A | 8/2000 | Kircher et al. | |
| 6,139,649 A | 10/2000 | Wynns | |
| 6,143,424 A | 11/2000 | Jonte et al. | |
| 6,153,064 A | 11/2000 | Condra et al. | |
| 6,170,487 B1 | 1/2001 | Ishiguro et al. | |
| 6,176,992 B1 | 1/2001 | Talieh | |
| 6,196,936 B1 | 3/2001 | Meckel | |
| 6,228,445 B1 | 5/2001 | Tverberg | |
| 6,258,186 B1 | 7/2001 | Choi | |
| 6,296,805 B1 | 10/2001 | Laurent et al. | |
| 6,309,517 B1 | 10/2001 | Condra et al. | |
| 6,322,907 B1 | 11/2001 | Hauser et al. | |
| 6,328,872 B1 | 12/2001 | Talieh et al. | |
| 6,331,241 B1 | 12/2001 | Ilgar | |
| 6,352,235 B2 | 3/2002 | Cizek | |
| 6,406,610 B1 | 6/2002 | Lowe | |
| 6,409,904 B1 | 6/2002 | Uzoh et al. | |
| 6,475,642 B1 | 11/2002 | Zhao et al. | |
| 6,475,645 B1 | 11/2002 | Osman et al. | |
| 6,497,920 B1 | 12/2002 | Pfaendtner et al. | |
| 6,548,192 B2 | 4/2003 | Chen | |
| 6,548,193 B2 | 4/2003 | Chen | |
| 6,551,722 B2 | 4/2003 | Jonte et al. | |
| 6,706,416 B1 | 3/2004 | Cacace | |
| 6,720,088 B2 | 4/2004 | Zhao et al. | |
| 6,755,960 B1 | 6/2004 | Frischauf et al. | |
| 6,837,979 B2 | 1/2005 | Uzoh et al. | |
| 6,881,282 B2 | 4/2005 | Dupuis et al. | |
| 6,921,586 B2 | 7/2005 | Zhao et al. | |
| 7,166,323 B2 | 1/2007 | Chung et al. | |
| 7,425,255 B2 | 9/2008 | Detor et al. | |
| 7,442,268 B2 | 10/2008 | Sun | |
| 7,553,517 B1 | 6/2009 | Jablonski et al. | |
| 7,842,400 B2 | 11/2010 | Yamaji et al. | |
| 7,879,160 B2 | 2/2011 | Sun | |
| 7,959,747 B2 | 6/2011 | Sun | |
| 8,123,967 B2 | 2/2012 | Anton et al. | |
| 8,273,235 B2 | 9/2012 | Chapaneri et al. | |
| 8,309,233 B2 | 11/2012 | Facchini et al. | |
| 8,337,643 B2 | 12/2012 | Sun | |
| 8,366,844 B2 | 2/2013 | Sun | |
| 8,367,217 B2 | 2/2013 | Facchini et al. | |
| 8,557,397 B2 | 10/2013 | Bullard et al. | |
| 8,608,875 B1 | 12/2013 | Bullard | |
| 8,628,861 B2 | 1/2014 | Bullard et al. | |
| 8,784,997 B2 | 7/2014 | Bullard et al. | |
| 8,790,790 B2 | 7/2014 | Bullard et al. | |
| 8,795,447 B2 | 8/2014 | Bullard et al. | |
| 9,333,727 B2 | 5/2016 | Bullard et al. | |
| 2002/0192494 A1 | 12/2002 | Tzatzov et al. | |
| 2002/0192590 A1 | 12/2002 | Mase et al. | |
| 2003/0064245 A1 | 4/2003 | Vostrikov et al. | |
| 2003/0178314 A1 | 9/2003 | Polinski et al. | |
| 2003/0190492 A1 | 10/2003 | Wada et al. | |
| 2004/0048977 A1 | 3/2004 | Wilke et al. | |
| 2005/0090016 A1 | 4/2005 | Rich et al. | |
| 2005/0095358 A1 | 5/2005 | Park et al. | |
| 2006/0257683 A1 | 11/2006 | Polinski et al. | |
| 2007/0009755 A1 | 1/2007 | Ben et al. | |
| 2008/0076683 A1 | 3/2008 | Okamoto et al. | |
| 2008/0251389 A1 | 10/2008 | Kingston | |
| 2009/0130410 A1 | 5/2009 | Damasse et al. | |
| 2010/0081006 A1 | 4/2010 | Leidolf, Jr. et al. | |
| 2010/0167087 A1 | 7/2010 | Wijenberg et al. | |
| 2010/0221574 A1 | 9/2010 | Rochester | |
| 2010/0243192 A1 | 9/2010 | Balasubramanian et al. | |
| 2010/0304179 A1 | 12/2010 | Facchini et al. | |
| 2011/0117384 A1 | 5/2011 | Biswas et al. | |
| 2011/0269051 A1 | 11/2011 | Wijenberg et al. | |
| 2011/0300454 A1 | 12/2011 | Goller et al. | |
| 2012/0052319 A1 | 3/2012 | Sugawara et al. | |
| 2012/0156366 A1 | 6/2012 | Cetel et al. | |
| 2012/0189868 A1 | 7/2012 | Borovik et al. | |
| 2013/0171471 A1 | 7/2013 | Bullard et al. | |
| 2013/0252022 A1 | 9/2013 | Bullard et al. | |
| 2013/0309410 A1 | 11/2013 | Bullard et al. | |
| 2014/0014236 A1 | 1/2014 | Nozaki et al. | |
| 2014/0037852 A1 | 2/2014 | Bullard et al. | |
| 2014/0037987 A1 | 2/2014 | Bullard et al. | |
| 2014/0079958 A1 | 3/2014 | Bullard et al. | |
| 2014/0106123 A1 | 4/2014 | Tapia De La Fuente | |
| 2014/0238555 A1 | 8/2014 | Funakawa et al. | |
| 2014/0322555 A1 | 10/2014 | Walter et al. | |
| 2014/0345910 A1 | 11/2014 | Wang et al. | |
| 2015/0099095 A1 | 4/2015 | Pershin et al. | |
| 2015/0167131 A1 | 6/2015 | Bullard et al. | |
| 2015/0345041 A1 | 12/2015 | Ilgar et al. | |
| 2016/0230284 A1 | 8/2016 | McDermott et al. | |

FOREIGN PATENT DOCUMENTS

| | | |
|---|---|---|
| CN | 1433486 A | 7/2003 |
| DE | 2008664 A1 | 9/1971 |
| DE | 2507242 A1 | 9/1976 |
| DE | 3201641 A1 | 7/1983 |
| DE | 10306649 A1 | 9/2004 |
| EP | 0182964 A1 | 6/1986 |
| EP | 0204318 A2 | 12/1986 |
| EP | 0290836 A2 | 11/1988 |
| EP | 0892088 A2 | 1/1999 |
| EP | 1186680 A2 | 3/2002 |
| EP | 1278899 B1 | 6/2004 |
| EP | 1844176 B1 | 4/2011 |
| EP | 2382336 B1 | 3/2013 |
| GB | 1035827 A | 7/1966 |
| GB | 1313545 A | 4/1973 |
| GB | 1431355 A | 4/1976 |
| GB | 1487352 A | 9/1977 |
| JP | 4733244 | 8/1972 |
| JP | S531162 A | 1/1978 |
| JP | S57143489 A | 9/1982 |
| JP | S58177459 A | 10/1983 |
| JP | S58181860 A | 10/1983 |
| JP | S59140392 A | 8/1984 |
| JP | S59212143 A | 12/1984 |
| JP | S60177176 A | 9/1985 |
| JP | S60230995 A | 11/1985 |
| JP | S6179758 A | 4/1986 |
| JP | S62297491 A | 12/1987 |
| JP | S63499 A | 1/1988 |
| JP | S6487761 A | 3/1989 |
| JP | H01195268 A | 8/1989 |
| JP | H02274866 A | 11/1990 |
| JP | H03197693 A | 8/1991 |
| JP | H0472091 A | 3/1992 |
| JP | H07310166 A | 11/1995 |
| JP | H07310167 A | 11/1995 |
| JP | H1060527 A | 3/1998 |
| JP | H10226873 A | 8/1998 |
| JP | 2009062590 A | 3/2009 |
| JP | 2011116584 A | 6/2011 |
| WO | WO1991004346 A1 | 4/1991 |
| WO | WO-2010053729 A1 | 5/2010 |
| WO | WO-2010075998 A2 | 7/2010 |
| WO | WO-2011121121 A2 | 10/2011 |
| WO | WO-2013101574 A1 | 7/2013 |
| WO | WO-2013172911 | 11/2013 |
| WO | WO-2014051683 A1 | 4/2014 |
| WO | WO-2015006330 A1 | 1/2015 |
| WO | WO-2015089097 A1 | 6/2015 |
| WO | WO-2015147301 A1 | 10/2015 |

(56) References Cited

FOREIGN PATENT DOCUMENTS

| WO | WO-2016130548 A1 | 8/2016 |
|---|---|---|
| WO | WO-2017156069 A1 | 9/2017 |
| WO | WO-2017201418 A1 | 11/2017 |
| WO | WO-2018013863 A1 | 1/2018 |

OTHER PUBLICATIONS

Davies, et al. The diffusion of chromium in iron and low carbon steels. Acta Metallurgica, 1967, pp. 1799-1804, vol. 15.
European search report and search opinion dated Mar. 27, 2017 for EP Application No. 14869172.8.
Gupta, et al. Experimental and theoretical concentration profiles at the surface of chromized iron. Metallurgical Trans. (A), 1982, pp. 495-497, vol. 13A.
Hudson, R. M. "Pickling and Descaling". Surface Engineering, vol. 5. ASM Handbook, ASM International. 1994. pp. 67-78.
International preliminary report on patentability dated Jun. 29, 2011 for PCT Application No. PCT/EP2009/009246.
International search report and written opinion dated Feb. 8, 2013 for PCT Application No. US2012/070469.
International search report and written opinion dated Mar. 31, 2015 for PCT Application No. PCT/US2014/069383.
International search report and written opinion dated Jun. 3, 2016 for PCT Application No. PCT/US2016/017155.
International search report and written opinion dated Aug. 19, 2013 for PCT Application No. US 2013/030902.
International Search Report and Written Opinion of the International Searching Authority PCT/US2013/027725, Apr. 15, 2013.
International search report dated Aug. 9, 2010 for PCT Application No. PCT/EP2009/009246.
Kawamura, et al. Determination of surface chroium contents of chromized steel by fluorescent x-ray analysis. Transactions of the Japan Institute of Metals, 1969, 10:267-270.
Leferink, et al. Chromium diffusion coatings on low-alloyed steels for corrosion protection under sulphidizing conditions. VGB Kraftwerkstecknick, 1993, pp. 1014, vol. 73/3.
Meier, et al. Diffusion chromizing of ferrous alloys. Surface and coating technology, 1989, 29/40; 53-64.
Notice of allowance dated May 22, 2014 for U.S. Appl. No. 14/052,712.
Notice of allowance dated Jun. 6, 2014 for U.S. Appl. No. 14/052,709.
Notice of allowance dated Jun. 11, 2014 for U.S. Appl. No. 14/052,710.
Notice of allowance dated Jun. 24, 2014 for U.S. Appl. No. 14/052,712.
Notice of allowance dated Sep. 3, 2013 for U.S. Appl. No. 13/629,699.
Notice of allowance dated Sep. 30, 2013 for U.S. Appl. No. 13/800,698.
Notice of Allowance dated Oct. 16, 2013 for U.S. Appl. No. 13/776,941.
Office action dated Jan. 15, 2014 for U.S. Appl. No. 14/052,709.
Office action dated Jan. 17, 2014 for U.S. Appl. No. 14/052,712.
Office action dated Jan. 22, 2014 for U.S. Appl. No. 14/052,710.
Office action dated Mar. 6, 2013 for U.S. Appl. No. 13/629,699.
Office action dated Mar. 23, 2017 for U.S. Appl. No. 14/565,216.
Office action dated Mar. 31, 2017 for U.S. Appl. No. 15/019,887.
Office action dated May 21, 2013 for U.S. Appl. No. 13/629,699.
Office action dated May 22, 2014 for U.S. Appl. No. 14/052,709.
Office action dated May 31, 2016 for U.S. Appl. No. 15/019,887.
Office action dated Jul. 29, 2013 for U.S. Appl. No. 13/800,698.
Office action dated Jul. 31, 2013 for U.S. Appl. No. 13/776,941.
Office action dated Sep. 6, 2016 for U.S. Appl. No. 15/019,887.
Office action dated Sep. 19, 2017 for U.S. Appl. No. 14/716,358.
Office action dated Sep. 19, 2013 for U.S. Appl. No. 13/776,941.
Philippe, et al. Electroplating of stainless steel. Chem. Mater., 2008, 20, 3377-3384.
Piwonka, Thomas S. "Foundry Practice for Ferrous Alloys". Metals Handbook Desk Edition, 2nd edition. 1998.
Pollock, et al. Nickel-based superalloys for advanced turbine engines: chemistry, microstructure and properties. Journal of propulsion and power 22.2 (2006): 361-374.
Rao, V. "Powder Metallurgy" in manufacturing science and technology—manufacturing processes and machine tools. New Age International LTD, New Delhi, 2002, ISBN 81-224-1364-1.
Schubert, G. Electron Beam Welding—Process, Application and Equipment. PTR-Precision Technologies Inc., http://www.ptreb.com, published Nov. 30, 2010, downloaded Mar. 21, 2014.
Viswanathan, et al. Occlusion Plating of Nickel/Graphite Composites. Metal Finishing. Oct. 1979;77(10):67-9.
Wang, et al. Chromizing behaviors of a low carbon steel processed by means of surface mechanical attrition treatment. Acta Materialia, 2005, 53, 2081-2089.
Wisti, M., and M. Hingwe. "Heat Treating vol. 4." ASM Handbooks Online. ASM Handbook, 1991. Web. Jul. 24, 2013.
Yamashita, T. Microstructure of Austenitic stainless Steel Explosively Bonded to low Carbon-Steel. J. Electron Microsc. (Tokyo), 1973, 22-1, 13-18.
Zamani, et al. Explosive welding of stainless steel-carbon steel coaxial pipes. J. Mat. Sci., 2012, 47-2, 685-695.
Zhang, et al. Interface fracture behavior of electroplated coating on metal substrate under compressive strain. J. Materials Processing Tech., 2009, pp. 1337-1341, vol. 209.
U.S. Appl. No. 14/565,216 Office Action dated Dec. 27, 2017.
Co-pending U.S. Appl. No. 16/121,280, filed Sep. 4, 2018.
Co-pending U.S. Appl. No. 16/193,616, filed Nov. 16, 2018.
Co-pending U.S. Appl. No. 16/245,729, filed Jan. 11, 2019.
Machine translation of DE 2507242 A published Sep. 1975.
Machine translation of JP 2009-062590 A by Yamada, Eiko published Mar. 2009.
PCT/US2017/021281 International Search Report and Written Opinion dated May 10, 2017.
PCT/US2017/033559 International Search Report and Written Report dated Jul. 11, 2017.
PCT/US2017/042012 International Search Report and Written Opinion dated Oct. 24, 2017.
Sponge iron. (n.d.). Dictionary.com Unabridged. Retrieved Jul. 24, 2013, from Dictionary.com website: http://dictionary.reference.com/browse/Sponge-iron.
EP17763960.6 The Extended European Search Report dated Oct. 15, 2019.
EP17828499.8 The Partial Supplemental European Search Report dated Feb. 21, 2020.
U.S. Appl. No. 16/245,729 Office Action dated Mar. 11, 2020.
EP17828499.8 the Extended European Search Report dated Jun. 25, 2020.
PCT/US2020/018243 International Search Report dated Jun. 26, 2020.
U.S. Appl. No. 16/245,729 Office Action dated Jul. 21, 2020.

* cited by examiner

|  | $H_2O$ (g) | Viscosity (cP) at 1000 s$^{-1}$ | Shear Thinning Index (100 s$^{-1}$:1000 s$^{-1}$) | Discontinuity | Yield Stress (Pa) |
|---|---|---|---|---|---|
| E15104A 4.2 g $H_2O$ #1 | 4.22 | 136 | 6.1 | y | 71 |
| E15104A 4.4 g $H_2O$ #2 | 4.40 | 129 | 6.1 | y | 62 |
| E15104A 4.6 g $H_2O$ #3 | 4.61 | 106 | 5.8 | y | 52 |
| E15104A 4.8 g $H_2O$ #4 | 4.81 | 88 | 6.0 | y | 44 |
| E15104A 5.0 g $H_2O$ #5 | 5.06 | 84 | 55.8 | y | 43 |
| E15104A 5.2 g $H_2O$ #6 | 5.20 | 76 | 5.7 | y | 35 |
| E15104A 5.4 g $H_2O$ #7 | 5.41 | 61 | 5.8 | y | 30 |

*FIG. 6*

|  | Cr (g) | Viscosity at 1000 s$^{-1}$ (cP) | Shear Thinning Index 100:1000 | Discontinuity | Apparent Yield Stress (Pa) |
| --- | --- | --- | --- | --- | --- |
| E15105A 1.0g Cr #1 | 1 | 26 | 5.5 | y | 10.5 |
| E15105A 2.0g Cr #2 | 2 | 30 | 5.5 | y | 12.2 |
| E15105A 4.0g Cr #3 | 4 | 43 | 6.2 | y | 18.3 |
| E15105A 7.0g Cr #4 | 7 | 52 | 6.1 | y | 22.7 |
| E15105A 10.0g Cr #5 | 10 | 66 | 6.1 | y | 33.0 |
| E15105A 15.0g Cr #6 | 15 | 88 | 5.9 | y | 42.0 |
| E15105A 20.0g Cr #7 | 20 | 125 | 5.5 | y | 59.0 |
| E15105A 25.0g Cr #8 | 25 | 175 | 5.0 | y | 74.9 |
| E15105A 30.0g Cr #9 | 30 | 300 | 4.1 | y | 93.0 |
| E15105A 35.0g Cr #10 | 35 | 442 | 3.0 | y | 104.8 |

*FIG. 8*

| | $Al_2O_3$ (g) | Viscosity at 1000 s$^{-1}$ (cP) | Shear Thinning Index 100:1000 | Discontinuity | Apparent Yield Stress (Pa) |
|---|---|---|---|---|---|
| E15110A A008 $Al_2O_3$ #4 | 4.49 | 57 | 5.6 | y | 26.3 |
| E15110A A008 $Al_2O_3$ #5 | 5.01 | 72 | 5.8 | y | 34.9 |
| E15110A A008 $Al_2O_3$ #6 | 5.50 | 84 | 5.9 | y | 42.0 |
| E15110A A008 $Al_2O_3$ #7 | 6.00 | 110 | 5.7 | y | 51.8 |
| E15110A A008 $Al_2O_3$ #8 | 6.50 | 138 | 6.1 | y | 72.4 |
| E15110A A008 $Al_2O_3$ #9 | 7.01 | 176 | 5.6 | y | 85.3 |
| E15110A A008 $Al_2O_3$ #10 | 7.48 | 203 | 5.9 | y | 104.5 |

*FIG. 12*

| | Activator Amount (g) | Viscosity at 1000 s$^{-1}$ (cP) | Shear Thinning Index 100:1000 | Discontinuity | Apparent Yield Stress (Pa) |
|---|---|---|---|---|---|
| E15110A A008 MgCl$_2$ #11 | 0.10 | 93 | 5.8 | y | 47.7 |
| E15110A A008 MgCl$_2$ #12 | 0.30 | 79 | 5.7 | y | 38.6 |
| E15110A A008 MgCl$_2$ #13 | 0.50 | 68 | 5.8 | y | 30.7 |
| E15110A A008 MgCl$_2$ #14 | 0.80 | 59 | 5.2 | y | 24.5 |
| E15110A A008 MgCl$_2$ #15 | 1.00 | 53 | 5.2 | y | 21.4 |
| E15110A A008 MgCl$_2$ #16 | 1.80 | 44 | 4.3 | y | 10.0 |
| E15110A A008 MgCl$_2$ #17 | 3.00 | 39 | 3.8 | y | 6.3 |
| E15110A A008 MgCl$_2$ #18 | 4.00 | 35 | 3.1 | y | 4.1 |

*FIG. 16*

| Name | pH | viscosity at 1000 s$^{-1}$ (cP) | yield stress (Pa) |
|---|---|---|---|
| E15055A Magnesium Acetate #1 | 7.98 | 2290 | 562 |
| E15055A Magnesium Acetate #2 | 7.85 | 192 | 61 |
| E15055A Magnesium Acetate #3 | 7.71 | 189 | 46 |
| E15055A Magnesium Acetate #4 | 7.56 | 176 | 14 |
| E15055A Magnesium Acetate #5 | 7.15 | 880 | 26 |
| E15055A Magnesium Sulfate #1 | 8.82 | 179 | 80 |
| E15055A Magnesium Sulfate #2 | 7.65 | 209 | 76 |
| E15055A Magnesium Sulfate #3 | 7.5 | 156 | 39 |
| E15055A Magnesium Sulfate #4 | 7.24 | 102 | 30 |
| E15055A Magnesium Sulfate #5 | 7.19 | - | |

FIG. 25

| Name | pH | viscosity at 1000 s$^{-1}$ (cP) | Yield stress (Pa) |
|---|---|---|---|
| E15085A NaCl #1 | 9.1 | 31 | 5 |
| E15085A NaCl #2 | 8.22 | 209 | 94 |
| E15085A NaCl #3 | 8.25 | 256 | 117 |
| E15085A NaCl #4 | 8.05 | 155 | 63 |
| E15085A NaCl #5 | 8.13 | 182 | 62 |
| E15085A MgFormate #1 | 8.04 | 285 | 155 |
| E15085A NaCO3 #1 | 10.16 | 85 | 0 |
| E15085A NaCO3 #2 | 11.2 | 198 | 75 |
| E15085A NaCO3 #3 | 11.27 | 210 | 75 |
| E15085A NaCO3 #4 | 11.42 | 250 | 82 |
| E15102A LiCl #1 | 7.95 | 150 | 86 |
| E15102A LiCl #2 | 7.6 | 296 | 149 |
| E15102A LiCl #3 | 7.45 | 253 | 132 |
| E15102A LiCl #4 | 7.21 | 215 | 71 |
| E15102A Li AcO #1 | 8.5 | 164 | 95 |
| E15102A Li AcO #2 | 8.32 | 215 | 115 |
| E15102A Li AcO #3 | 8.3 | 166 | 80 |
| E15102A Li AcO #4 | 8.42 | 101 | 24 |
| E15102A Na AcO #1 | 9 | 25 | 6 |
| E15102A Na AcO #2 | 9.05 | 184 | 71 |
| E15102A Na AcO #3 | 9.08 | 158 | 58 |
| E15102A Na AcO #4 | 9.15 | 133 | 32 |
| E15102A KCl #1 | 8.97 | 24 | 3 |
| E15102A KCl #2 | 8.88 | 165 | 77 |
| E15102A KCl #3 | 8.79 | 154 | 69 |
| E15102A KCl #4 | 8.68 | 120 | 53 |
| E15102A NH4AcO #1 | 8.86 | 42 | 13 |
| E15102A NH4AcO #2 | 8.1 | 152 | 62 |
| E15102A NH4AcO #3 | 8.04 | 127 | 48 |
| E15102A NH4AcO #4 | 7.96 | 84 | 26 |
| E15102A Basic AlAcO #1 | 7.35 | 299 | 146 |
| E15102A Dibasic AlAcO #1 | 8.55 | 31 | 1 |
| E15102A Dibasic AlAcO #2 | 5.17 | 34 | 2 |
| E15102A Dibasic AlAcO #3 | 4.91 | 50 | 4 |
| E15102A Dibasic AlAcO #4 | 4.67 | - | |

*FIG. 26*

METHODS AND SYSTEMS FOR SLURRY COATING

CROSS-REFERENCE

This application is a continuation application of International PCT/US2016/017155, filed Feb. 9, 2016, which claims priority to U.S. Provisional Patent Application Ser. No. 62/114,560, filed Feb. 10, 2015, and U.S. Provisional Patent Application Ser. No. 62/232,161, filed Sep. 24, 2015, each of which is entirely incorporated herein by reference.

BACKGROUND

Steel can be an alloy of iron and other elements, including carbon. When carbon is the primary alloying element, its content in the steel may be between 0.002% and 2.1% by weight. Without limitation, the following elements can be present in steel: carbon, manganese, phosphorus, sulfur, silicon, and traces of oxygen, nitrogen and aluminum. Alloying elements added to modify the characteristics of steel can include without limitation: manganese, nickel, chromium, molybdenum, boron, titanium, vanadium and niobium.

Stainless steel can be a material that does not readily corrode, rust (or oxidize) or stain with water. There can be different grades and surface finishes of stainless steel to suit a given environment. Stainless steel can be used where both the properties of steel and resistance to corrosion are beneficial.

SUMMARY

The present disclosure provides systems and methods for forming material layers using slurries. Examples of such material layers include but are not limited to stainless steel, silicon steel, and noise vibration harshness damping steel.

The present disclosure provides systems and methods that employ slurries to form layers adjacent to substrates. Such layers can include, for example, one or more of iron, chromium, nickel, silicon, vanadium, titanium, boron, tungsten, aluminum, molybdenum, cobalt, manganese, zirconium, and niobium, oxides thereof, nitrides thereof, sulfides thereof, or combinations thereof.

In an aspect, the present disclosure provides a slurry for forming at least one layer comprising at least one elemental metal adjacent to a substrate, comprising: (a) a solvent; (b) an alloying agent, wherein the alloying agent comprises the at least one elemental metal, and wherein the alloying agent is configured to diffuse to or into the substrate; (c) a halide activator that facilitates diffusion of the at least one elemental metal to the substrate; and (d) an inert species that aids in dispersing the alloying agent in the solvent, wherein the inert species has a particle size that is less than or equal to about 200 mesh.

In some embodiments, the alloying agent is configured to diffuse into the substrate. In some embodiments, a particle size of the alloying agent is greater than the particle size of the inert species. In some embodiments, the particle size of the alloying agent is less than about 140 mesh. In some embodiments, the alloying agent comprises carbon. In some embodiments, the alloying agent comprises a transition metal. In some embodiments, the alloying agent is selected from the group consisting of iron, chromium, nickel, silicon, vanadium, titanium, boron, tungsten, aluminum, molybdenum, cobalt, manganese, zirconium, niobium and combinations thereof. In some embodiments, the alloying agent is a ferroalloy of a transition metal. In some embodiments, the alloying agent is selected from the group consisting of ferrosilicon (FeSi), ferrochrome (FeCr), chromium and combinations thereof. In some embodiments, the alloying agent is a salt or an oxide. In some embodiments, at least one elemental metal is a transition metal. In some embodiments, the at least one elemental metal is selected from the group consisting of chromium, nickel, aluminum, silicon, vanadium, titanium, boron, tungsten, aluminum, molybdenum, cobalt, manganese, zirconium, niobium and combinations thereof.

In some embodiments, the halide activator includes a monovalent metal, a divalent metal or a trivalent metal. In some embodiments, the halide activator is selected from the group consisting of magnesium chloride ($MgCl_2$), iron (II) chloride ($FeCl_2$), calcium chloride ($CaCl_2$), zirconium (IV) chloride ($ZrCl_4$), titanium (IV) chloride ($TiCl_4$), niobium (V) chloride ($NbCl_5$), titanium (III) chloride ($TiCl_3$), silicon tetrachloride ($SiCl_4$), vanadium (III) chloride ($VCl_3$), chromium (III) chloride ($CrCl_3$), trichlorosilane ($SiHCl_3$), manganese (II) chloride ($MnCl_2$), chromium (II) chloride ($CrCl_2$), cobalt (II) chloride ($CoCl_2$), copper (II) chloride ($CuCl_2$), nickel (II) chloride ($NiCl_2$), vanadium (II) chloride ($VCl_2$), ammonium chloride ($NH_4Cl$), sodium chloride ($NaCl$), potassium chloride ($KCl$), molybdenum sulfide ($MoS$), manganese sulfide ($MnS$), iron disulfide ($FeS_2$), chromium sulfide ($CrS$), iron sulfide ($FeS$), copper sulfide ($CuS$), nickel sulfide ($NiS$), and combinations thereof. In some embodiments, the halide activator is hydrated. In some embodiments, the halide activator is selected from the group consisting of iron chloride tetrahydrate ($FeCl_2 \cdot 4H_2O$), iron chloride hexahydrate ($FeCl_2 \cdot 6H_2O$), and magnesium chloride hexahydrate ($MgCl_2 \cdot 6H_2O$). In some embodiments, the halide activator is non-corrosive with respect to the substrate. In some embodiments, a molar ratio of a halide of the halide activator to the at least one elemental metal is at most about 10:1. In some embodiments, the halide activator decomposes to an oxide upon heating. In some embodiments, the halide activator aids in dispersing the alloying agent in the solvent.

In some embodiments, the inert species is selected from the group consisting of alumina ($Al_2O_3$), silica ($SiO_2$), titanium dioxide ($TiO_2$), magnesium oxide (MgO), calcium oxide (CaO), a clay and combinations thereof. In some embodiments, the clay is Bentonite clay, Monterey clay, Kaolin clay, a philosilicate clay or a combination thereof. In some embodiments, the inert species forms a hydrogen bond with itself and/or the metal halide activator in the slurry. In some embodiments, the particle size of the inert species is less than or equal to about 140 mesh. In some embodiments, the solvent is an aqueous solvent. In some embodiments, the solvent is an organic solvent. In some embodiments, the organic solvent is selected from the group consisting of an alcohol, a hydrocarbon, a ketone, and combinations thereof. In some embodiments, the alcohol is a C1 to C8 alcohol. In some embodiments, the solvent comprises an inorganic binder. In some embodiments, the inorganic binder is sodium silicate. In some embodiments, the solvent comprises an organic binder. In some embodiments, the organic binder is methyl cellulose or polyethylene oxide (PEO). In some embodiments, the alloying agent is configured to be deposited onto a surface of the substrate via a chemical vapor deposition (CVD) reaction. In some embodiments, the halide activator acts as a binder when the slurry is dried. In some embodiments, the solvent has a boiling temperature that is less than or equal to about 200° C. In some embodiments, a viscosity of the slurry is from about 1 centipoise (cP) to 1,000,000 cP. In some embodiments, a specific gravity of the slurry is from about 1 to 10. In some embodiments, a shear thinning index of the slurry is from about 1 to 8. In some embodiments, a pH of the slurry is from about 3 to 12.

In another aspect, the present disclosure provides a slurry for forming at least one layer comprising at least one elemental metal adjacent to a substrate, comprising: (a) a solvent; (b) an alloying agent, wherein the alloying agent comprises the at least one elemental metal, and wherein the alloying agent is configured to diffuse to or into the substrate; (c) a halide activator that aids in diffusion of the at least one elemental metal to the substrate, wherein a molar ratio of a halide of the halide activator to the at least one elemental metal is at most about 10:1; and (d) an inert species that aids in suspending the alloying agent in the slurry. In some embodiments, the alloying agent is configured to diffuse into the substrate.

In another aspect, the present disclosure provides a method for producing a slurry, comprising: (a) providing an alloying agent, a halide activator, a solvent, and an inert species to a vessel to provide a mixture, wherein a particle size of the inert species is less than or equal to about 200 mesh; and (b) subjecting the mixture having the alloying agent, halide activator, solvent and inert species to mixing, thereby producing the slurry.

In some embodiments, the method further comprises, in (a), adding the alloying agent, the halide activator and the inert species to the solvent to produce the mixture. In some embodiments, the method further comprises, in (b), adding an acid to the mixture. In some embodiments, the acid facilitates control of a viscosity and/or stability of the slurry. In some embodiments, the mixing occurs at a shear rate from about 1 $s^{-1}$ to 10000 $s^{-1}$.

In some embodiments, the alloying agent comprises carbon. In some embodiments, the alloying agent comprises one or more of iron, chromium, nickel, silicon, vanadium, titanium, boron, tungsten, aluminum, molybdenum, cobalt, manganese, zirconium, niobium and combinations thereof. In some embodiments, the alloying agent is selected from the group consisting of ferrosilicon (FeSi), ferrochrome (FeCr), chromium and combinations thereof.

In some embodiments, the halide activator includes a monovalent metal, a divalent metal or a trivalent metal. In some embodiments, the halide activator is selected from the group consisting of magnesium chloride ($MgCl_2$), iron (II) chloride ($FeCl_2$), calcium chloride ($CaCl_2$), zirconium (IV) chloride ($ZrCl_4$), titanium (IV) chloride ($TiCl_4$), niobium (V) chloride ($NbCl_5$), titanium (III) chloride ($TiCl_3$), silicon tetrachloride ($SiCl_4$), vanadium (III) chloride ($VCl_3$), chromium (III) chloride ($CrCl_3$), trichlorosilane (SiHCl3), manganese (II) chloride ($MnCl_2$), chromium (II) chloride ($CrCl_2$), cobalt (II) chloride ($CoCl_2$), copper (II) chloride ($CuCl_2$), nickel (II) chloride ($NiCl_2$), vanadium (II) chloride ($VCl_2$), ammonium chloride ($NH_4Cl$), sodium chloride (NaCl), potassium chloride (KCl), molybdenum sulfide (MoS), manganese sulfide (MnS), iron disulfide ($FeS_2$), chromium sulfide (CrS), iron sulfide (FeS), copper sulfide (CuS), nickel sulfide (NiS) and combinations thereof. In some embodiments, the halide activator is hydrated. In some embodiments, the halide activator is selected from the group consisting of iron chloride tetrahydrate ($FeCl_2 \cdot 4H_2O$), iron chloride hexahyrdate ($FeCl_2 \cdot 6H_2O$) and magnesium chloride hexahydrate ($MgCl_2 \cdot 6H_2O$). In some embodiments, a molar ratio of a halide of the halide activator to the alloying agent is at most about 10:1. In some embodiments, the inert species is selected from the group consisting of alumina ($Al_2O_3$), silica ($SiO_2$), titanium dioxide ($TiO_2$), magnesium oxide (MgO), calcium oxide (CaO), a clay and combinations thereof. In some embodiments, the clay is Bentonite clay, Monterey clay, Kaolin clay, a philosilicate clay or a combination thereof.

In some embodiments, the particle size of the inert species is less than or equal to about 600 mesh. In some embodiments, the solvent is an aqueous solvent. In some embodiments, the solvent is an organic solvent. In some embodiments, the solvent comprises an inorganic binder. In some embodiments, the inorganic binder is sodium silicate. In some embodiments, the solvent comprises an organic binder. In some embodiments, the organic binder is methyl cellulose or polyethylene oxide (PEO).

In another aspect, the present disclosure provides a method for producing a slurry, comprising: (a) providing an alloying agent, a metal halide activator, a solvent, and an inert species to a vessel to provide a mixture, wherein a molar ratio of a halide of the halide activator to the alloying agent is at most about 10:1; and (b) subjecting the mixture having the alloying agent, metal halide activator, solvent and inert species to mixing, thereby producing the slurry.

In another aspect, the present disclosure provides a method for coating a substrate with at least one layer comprising at least one elemental metal adjacent to the substrate, comprising: (a) coating at least a portion of the substrate with a slurry to generate a slurry-coated substrate, wherein the slurry comprises (i) a solvent, (ii) an alloying agent, wherein the alloying agent comprises the at least one elemental metal, and wherein the alloying agent is configured to diffuse to or into the substrate, (iii) a metal halide activator that facilitates diffusion of the at least one elemental metal to the substrate, and (iv) an inert species that aids in suspending the alloying agent in the solvent, wherein the inert species has a particle size that is less than or equal to about 200 mesh; and (b) subjecting the slurry-coated substrate to annealing under conditions that are sufficient to diffuse the at least one elemental metal to or into the substrate, to generate a layer adjacent to the substrate comprising the at least one elemental metal.

In some embodiments, the alloying agent is configured to diffuse into the substrate. In some embodiments, the method further comprises, prior to (b), incubating the slurry-coated substrate at an incubation temperature greater than a boiling temperature of the solvent, wherein the solvent is substantially removed from the slurry by evaporation to generate a dry film on the slurry-coated substrate. In some embodiments, the method further comprises incubating the slurry-coated substrate at the incubation temperature under vacuum conditions. In some embodiments, the dry film (1) has a green strength suitable to survive flexing to a 20 inch diameter are 20 times (positive and negative) and pass a tape test with small amount of powdering, and/or (2) is capable of surviving a high speed roll coating process.

In some embodiments, the method further comprises incubating the slurry-coated substrate at the incubation temperature for about 10 seconds to 5 minutes. In some embodiments, the incubation temperature is from about 50° C. to about 300° C. In some embodiments, the method further comprises, after the incubating, maintaining the slurry-coated substrate having the dry film under vacuum conditions prior to (b). In some embodiments, prior to (a), the substrate is provided in a coil and the coil is unwound prior to the coating. In some embodiments, after (a), the unwound coil is wound into a coil. In some embodiments, prior to (a), the substrate is provided as a wire, pipe, tube, slab, a coiled mesh, a dipped formed part, a sheet, a wire rope, or a rod.

In some embodiments, the annealing conditions comprise an annealing temperature, an annealing time and an annealing atmosphere. In some embodiments, the annealing temperature is from about 800° C. to 1300° C. In some embodiments, the total annealing time is from about 5 hours to 200 hours, optionally including cooling, and optionally wherein a time at a maximum temperature is between 1 hour and 100 hours. In some embodiments, the annealing atmosphere comprises hydrogen ($H_2$), nitrogen ($N_2$), argon (Ar) or a combination thereof. In some embodiments, the annealing atmosphere is a vacuum. In some embodiments, in (a), the coating is via one or more selected from the group consisting of roll coating, dipping, painting, spin coating, printing, spraying, slot coating, curtain coating, slide coating, and extrusion coating. In some embodiments, in (a), the coating is via slot coating. In some embodiments, the method further comprises, in (a), coating the at least a portion of the substrate with the slurry and an additional slurry in at least two cycles. In some embodiments, the slurry and the additional slurry are different. In some embodiments, the method further comprises, in (a), coating the at least a portion of the substrate with the slurry in multiple cycles. In some embodiments, the method further comprises, in (a), coating the at least a portion of the substrate with the slurry in multiple cycles, wherein the substrate is coated in a pattern.

In some embodiments, in (b), the substrate comprises a residue comprising the inert species after the subjecting the slurry-coated substrate to the annealing conditions. In some embodiments, after (b), the method further comprises removing the residue from the substrate. In some embodiments, in (b), the substrate is substantially free of Kirkendall voids after the subjecting the slurry-coated substrate to the annealing conditions. In some embodiments, the substrate comprises one or more grain pinning particles.

In some embodiments, the one or more grain pinning particles comprises a material selected from the group consisting of an intermetallic, a nitride, a carbide, a carbonitride of titanium, aluminum, niobium, vanadium and combinations thereof. In some embodiments, the substrate does not comprise free carbon. In some embodiments, the substrate is a metal-containing substrate. In some embodiments, the metal-containing substrate comprises one or more of iron, copper and aluminum. In some embodiments, the metal-containing substrate is steel. In some embodiments, the substrate is a ceramic substrate. In some embodiments, the layer comprises stainless steel. In some embodiments, the layer is an outer layer and the at least one elemental metal has a concentration that varies by no more than about 20 wt. % in the outer layer. In some embodiments, the substrate further comprises a bonding layer adjacent to the outer layer, wherein the at least one elemental metal has a concentration that decreases to less than about 1.0 wt. % in the bonding layer.

In some embodiments, the substrate further comprises a core region adjacent to the bonding layer that comprises substantially the same composition as the substrate. In some embodiments, the alloying agent comprises carbon. In some embodiments, the alloying agent is selected from the group consisting of iron, chromium, nickel, silicon, vanadium, titanium, boron, tungsten, aluminum, molybdenum, cobalt, manganese, zirconium, niobium and combinations thereof. In some embodiments, the at least one elemental metal is selected from the group consisting of chromium, nickel, aluminum, silicon, vanadium, titanium, boron, tungsten, aluminum, molybdenum, cobalt, manganese, zirconium, niobium and combinations thereof. In some embodiments, the alloying agent is selected from the group consisting of ferrosilicon (FeSi), ferrochrome (FeCr), chromium and combinations thereof. In some embodiments, the metal halide activator includes a monovalent metal, a divalent metal or a trivalent metal. In some embodiments, the metal halide activator is selected from the group magnesium chloride ($MgCl_2$), iron (II) chloride ($FeCl_2$), calcium chloride ($CaCl_2$), zirconium (IV) chloride ($ZrCl_4$), titanium (IV) chloride ($TiCl_4$), niobium (V) chloride ($NbCl_5$), titanium (III) chloride ($TiCl_3$), silicon tetrachloride ($SiCl_4$), vanadium (III) chloride ($VCl_3$), chromium (III) chloride ($CrCl_3$), trichlorosilance (SiHCl3), manganese (II) chloride ($MnCl_2$), chromium (II) chloride ($CrCl_2$), cobalt (II) chloride ($CoCl_2$), copper (II) chloride ($CuCl_2$), nickel (II) chloride ($NiCl_2$), vanadium (II) chloride ($VCl_2$), ammonium chloride ($NH_4Cl$), sodium chloride (NaCl), potassium chloride (KCl), molybdenum sulfide (MoS), manganese sulfide (MnS), iron disulfide ($FeS_2$), chromium sulfide (CrS), iron sulfide (FeS), copper sulfide (CuS), nickel sulfide (NiS) and combinations thereof.

In some embodiments, the metal halide activator is hydrated. In some embodiments, the metal halide activator is selected from the group consisting of iron chloride tetrahydrate ($FeCl_2 \cdot 4H_2O$), iron chloride hexahydrate ($FeCl_2 \cdot 6H_2O$) and magnesium chloride hexahydrate ($MgCl_2 \cdot 6H_2O$). In some embodiments, a molar ratio of a halide of the metal halide activator to the at least one elemental metal is at most about 10:1. In some embodiments, the inert species is selected from the group consisting of alumina ($Al_2O_3$), silica ($SiO_2$), titanium dioxide ($TiO_2$), magnesium oxide (MgO), calcium oxide (CaO), a clay and combinations thereof. In some embodiments, the clay is Bentonite clay, Monterey clay, Kaolin clay, a philosilicate clay or a combination thereof.

In some embodiments, the particle size of the inert species is less than or equal to about 300 mesh, less than or equal to about 400 mesh, less than or equal to about 500 mesh, or less than or equal to about 600 mesh. In some embodiments, the solvent is an aqueous solvent. In some embodiments, the solvent is an organic solvent. In some embodiments, the layer has a corrosion resistance of at least about 1 year under the copper acetic acid spray (CASS) test. In some embodiments, during (b), at least about 95% of the at least one elemental metal in the alloying agent diffuses to or into the substrate. In some embodiments, during (b), the at least one elemental metal is deposited on a surface of the substrate via a vapor deposition reaction and diffuses to or into the substrate. In some embodiments, the alloying agent is configured to diffuse into the substrate.

In another aspect, the present disclosure provides a method for forming at least one layer comprising at least one elemental metal adjacent to a substrate, comprising: (a) coating at least a portion of the substrate with a slurry to generate a slurry-coated substrate, wherein the slurry comprises (i) a solvent, (ii) an alloying agent, wherein the alloying agent comprises the at least one elemental metal, and wherein the alloying agent is configured to diffuse to or into the substrate, (iii) a halide activator that aids in diffusion of the at least one elemental metal to the substrate, wherein a molar ratio of a halide of the halide activator to the at least one elemental metal is at most about 10:1, and (iv) an inert species that aids in suspending the alloying agent in the slurry; and (b) subjecting the slurry-coated substrate to annealing conditions to diffuse the at least one elemental metal to or into the substrate, to generate the at least one layer adjacent to the substrate comprising the at least one elemental metal.

In some embodiments, the alloying agent is configured to diffuse into the substrate. In some embodiments, the layer has a functional component that is not connected with the substrate.

In another aspect, the present disclosure provides a method for forming a metal-containing object comprising a metal layer adjacent to a substrate, comprising: (a) coating at least a portion of the substrate with a slurry comprising an alloying agent having at least one elemental metal, thereby forming a slurry-coated substrate; and (b) subjecting the slurry-coated substrate to annealing under conditions that are sufficient to form the metal layer adjacent to the substrate, wherein the metal layer is coupled to the substrate with the aid of a diffusion layer between the metal layer and the substrate, wherein an amount of the alloying agent in the diffusion layer changes with depth at a rate between about −0.01% per micrometer and −5.0% per micrometer as measured by x-ray photoelectron spectroscopy.

In some embodiments, the slurry comprises a solvent, a halide activator and an inert species that aids in suspending the alloying agent in the slurry. In some embodiments, a molar ratio of a halide of the halide activator to the at least one elemental metal is at most about 10:1. In some embodiments, the inert species has a particle size that is less than or equal to about 200 mesh. In some embodiments, the substrate is a steel substrate.

In another aspect, the present disclosure provides a method for forming a metal-containing object comprising a metal layer adjacent to a substrate, comprising: (a) coating at least a portion of the substrate with a slurry comprising an alloying agent having at least one elemental metal, thereby forming a slurry-coated substrate; and (b) subjecting the slurry-coated substrate to annealing under conditions that are sufficient to form the metal layer adjacent to the substrate, wherein (i) the metal layer has a thickness of less than 500 micrometers, and (ii) in the metal layer, a concentration of the alloying agent is at a maximum in the substrate and decreases by no more than 20 wt. % over a depth of about 50 micrometers or less in the metal layer as measured with x-ray photoelectron spectroscopy.

In some embodiments, the metal-containing object is devoid of a material discontinuity between an outer layer of the metal-containing object and the substrate. In some embodiments, the slurry comprises a solvent, a halide activator and an inert species that aids in suspending the alloying agent in the slurry. In some embodiments, a molar ratio of a halide of the halide activator to the at least one elemental metal is at most about 10:1. In some embodiments, the inert species has a particle size that is less than or equal to about 200 mesh.

In another aspect, the present disclosure provides a method for forming a metal-containing object comprising a metal layer adjacent to a substrate, comprising: (a) coating at least a portion of the substrate with a slurry comprising an alloying agent having at least one elemental metal, thereby forming a slurry-coated substrate; and (b) subjecting the slurry-coated substrate to annealing under conditions that are sufficient to form the metal layer adjacent to the substrate, wherein in the metal layer, (i) the alloying agent has a concentration of at least 10 wt. % at a depth of less than or equal to 30 micrometers from a surface of the substrate, and (ii) the alloying agent has a concentration of at most 6 wt. % at a depth of greater than 150 micrometers from the surface of the substrate. In some embodiments, the alloying agent comprises chromium, nickel, or iron.

In some embodiments, the alloying agent has a concentration of at least 15 wt. % at a depth of less than or equal to 50 micrometers from the surface of the substrate. In some embodiments, the slurry comprises a solvent, a halide activator and an inert species that aids in suspending the alloying agent in the slurry. In some embodiments, a molar ratio of a halide of the halide activator to the at least one elemental metal is at most about 10:1. In some embodiments, the inert species has a particle size that is less than or equal to about 200 mesh.

Another aspect of the present disclosure provides a computer-readable medium comprising machine executable code that, upon execution by one or more computer processors, implements any of the methods above or elsewhere herein.

Another aspect of the present disclosure provides a computer system comprising one more ore computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

FIG. 6 is a table that shows the change in viscosity, shear thinning index, and yield stress as a result of varying amounts of water;

FIG. 8 is a table that shows change in viscosity, shear thinning index (10:1000 and 100:1000), and yield stress for a slurry as a result of varying amounts of chromium;

FIG. 12 is a table that shows change in viscosity, shear thinning index (10:1000 and 100:1000), and yield stress for a slurry as a result of varying amounts of aluminum (III) oxide;

FIG. 16 is a table that shows change in viscosity, shear thinning index (10:1000 and 100:1000), and yield stress for a slurry as a result of varying amounts of magnesium chloride;

FIG. 25 shows change in pH, viscosity, and yield stress with various magnesium salts across a range of concentrations of salts for a slurry;

FIG. 26 shows change in pH, viscosity, and yield stress with various salts across a range of concentrations of salts for a slurry;

DETAILED DESCRIPTION

Figure 1:
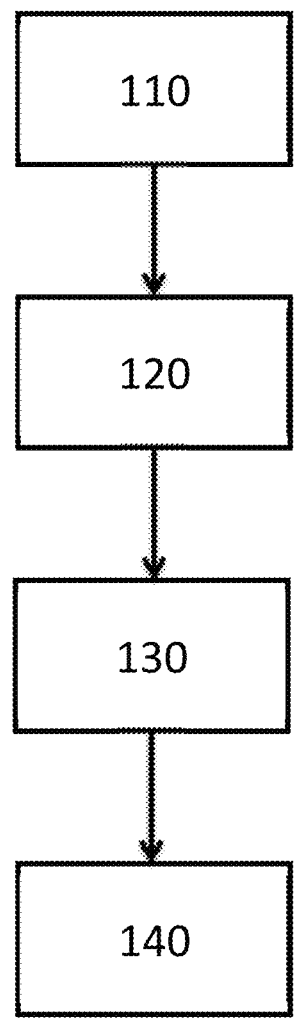
FIG. 1 illustrates a method for forming a layer adjacent to a substrate.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "slurry," as used herein, generally refers to a solution comprising a liquid phase and a solid phase. The solid phase may be in the liquid phase. A slurry may have one or more liquid phases and one or more solid phases.

The term "adjacent" or "adjacent to," as used herein, generally refers to 'next to', 'adjoining', 'in contact with,' and 'in proximity to.' In some instances adjacent to may be 'above' or 'below.' A first layer adjacent to a second layer may be in direct contact with the second layer, or there may be one or more intervening layers between the first layer and the second layer.

The present disclosure provides slurry compositions (or slurries), as well as systems and methods that employ the slurries to form layers adjacent to substrates. Such layers can include, for example, one or more of iron, chromium, nickel, silicon, vanadium, titanium, boron, tungsten, aluminum, molybdenum, cobalt, manganese, zirconium, and niobium, oxides thereof, nitrides thereof, sulfides thereof, or combinations thereof.

The present disclosure provides slurries for use in forming layers adjacent to substrates. A slurry can include various components. The components of the slurry may include an alloying agent, an activator such as a halide activator, a solvent, and an inert species. The alloying agent may contain at least one elemental species that is configured to diffuse to or into a substrate. Diffusion of the elemental species to or into the substrate may be facilitated by the activator. The alloying agent may be dispersed in the solvent with the aid of the inert species. The inert species may have a particle size that is less than or equal to about 200 mesh.

The elemental species in the alloying agent can diffuse into or onto the substrate according to a concentration gradient. For example, the concentration of the elemental species in the alloying agent can be highest on the surface of the substrate and can decrease according to a gradient along the depth of the substrate. The decrease in concentration can be linear, parabolic, Gaussian, or any combination thereof. The concentration of the alloying agent in the slurry can be selected based on the desired thickness of the alloy layer to be formed on the substrate. The particle size of the alloying agent may be less than about 140 mesh.

The elemental species in the alloying agent can be at transition metal. The elemental species in the alloying agent can be chromium, nickel, aluminum, silicon, vanadium, titanium, boron, tungsten, molybdenum, cobalt, manganese, zirconium, niobium, or combinations thereof.

The alloying agent can comprise carbon. For some applications, the alloying agent contains low levels of carbon. The alloying agent can comprise a transition metal. The alloying agent can comprise iron, chromium, nickel, silicon, vanadium, titanium, boron, tungsten, aluminum, molybdenum, cobalt, manganese, zirconium, niobium, or combinations thereof. The alloying agent can be a ferroalloy of a transition metal. The alloying agent can be ferrosilicon (FeSi), ferro chromium (FeCr), chromium (Cr), or combinations thereof. The alloying agent can be a salt or an oxide. The alloying agent can comprise chromium, nickel, iron, or combinations thereof.

The diffusion of the elemental species in the alloying agent to the substrate can be facilitated by an activator. The activator may be a halide activator. The halide may transport the elemental species in the alloying agent to the surface of the substrate and thus facilitate diffusion of the elemental species to the substrate. For example, the alloying agent may comprise chrome and the halide activator may comprise a chloride. Chloride precursors may transport chrome to the surface of the substrate. The molar ratio of a halide of the halide activator to the elemental species may be at most about 0.0001:1, 0.001:1, 0.1:1, 0.5:1, 1:1, 2:1, 3:1, 4:1, 5:1, 6:1, 7:1, 8:1, 9:1, or 10:1. The molar ratio of a halide of the halide activator to the elemental species may be from about 0.0001:1 to 10:1, or 0.001:1 to 5:1. The molar ratio of a halide of the halide activator to the elemental species may be at most about 10:1.

The diffusion of the elemental species in the alloying agent to the substrate can be facilitated by an activator. The activator may be a metal halide activator. The metal halide may transport the elemental species in the alloying agent to the surface of the substrate and thus facilitate diffusion of the elemental species to the substrate. For example, the alloying agent may comprise chrome and the metal halide activator may comprise a chloride. Chloride precursors may transport chrome to the surface of the substrate. The molar ratio of a halide of the metal halide activator to the elemental species may be at most about 0.0001:1, 0.001:1, 0.1:1, 0.5:1, 1:1, 2:1, 3:1, 4:1, 5:1, 6:1, 7:1, 8:1, 9:1, or 10:1. The molar ratio of the halide of the metal halide activator to the elemental species may be from about 0.0001:1 to 10:1, or 0.001:1 to 5:1.

The activator may also impact the adhesion of the slurry of the substrate. In addition, the activator may impact the viscosity of the slurry. Further, the activator may influence the green strength of the slurry-coated substrate. Green strength generally refers to the ability of a slurry-coated substrate to withstand handling or machining before the slurry is completely cured. Accordingly, the activator may be selected based on the desired degree of adhesion of the slurry to the substrate, the desired viscosity of the slurry, and the ability of the activator to increase the green strength of the slurry-coated substrate. In addition, the activator may be selected based on corrosivity of the activator with respect to the substrate. For example, because some metal halides can be corrosive to metal substrates and because corrosion may be undesirable, those metal halides may not selected as activators. In addition, some metal halides can be corrosive to components of a roll coating assembly which applies the slurry to the substrate. Such corrosion may be undesirable. Thus, those metal halides may not selected as activators. The activator may prevent the formation of Kirkendall voids at the boundary interface of the alloying agent and the substrate. Upon heating, a halide activator may decompose to an oxide. After annealing, the activator may act as a binder. In addition, after annealing, the activator may become inert. The concentration of activator can be variable. In some embodiments, the concentration of activator can be widely variable. The concentration of activator may depend on the amount of binders that are added to the slurry.

The activator may be a metal polymer. The activator may include a monovalent metal, a divalent metal, or a trivalent metal. The activator may be a di-metal halide. Examples of activators include magnesium chloride ($MgCl_2$), iron (II) chloride ($FeCl_2$), calcium chloride ($CaCl_2$), zirconium (IV) chloride ($ZrCl_4$), titanium (IV) chloride ($TiCl_4$), niobium (V) chloride ($NbCl_5$), titanium (III) chloride ($TiCl_3$), silicon tetrachloride ($SiCl_4$), vanadium (III) chloride ($VCl_3$), chromium (III) chloride ($CrCl_3$), trichlorosilane ($SiHCl_3$), manganese (II) chloride ($MnCl_2$), chromium (II) chloride ($CrCl_2$), cobalt (II) chloride ($CoCl_2$), copper (II) chloride ($CuCl_2$), nickel (II) chloride ($NiCl_2$), vanadium (II) chloride ($VCl_2$), ammonium chloride ($NH_4Cl$), sodium chloride (NaCl), potassium chloride (KCl), and combinations thereof.

Magnesium chloride may be a more desirable activator than iron chloride. Magnesium chloride may be cheaper in cost than iron chloride, while rendering a green strength similar to the green strength rendered by iron chloride. A slurry with magnesium chloride as the activator can exhibit an increase in viscosity. The increased viscosity of the slurry may not increase the thickness of the dried slurry coating.

The activator may be hydrated. Non-limiting examples of hydrated activators include iron chloride tetrahydrate ($FeCl_2 \cdot 4H_2O$), iron chloride hexahyrdate ($FeCl_2 \cdot 6H_2O$), and magnesium chloride hexahydrate ($MgCl_2 \cdot 6H_2O$). Magnesium chloride hexahydrate may be a more desirable hydrated activator than iron chloride tetrahydrate. Magnesium chloride hexahydrate may be cheaper in cost than iron chloride tetrahydrate. In addition, magnesium chloride hexahydrate may be less corrosive to the substrate than iron chrloride tetrahydrate.

Salt additives may be used to obtain desired physical properties of the slurry. Salts may be monovalent or divalent salts. Non-limiting examples of salt additives include molybdenum (II) sulfide (MoS), manganese (II) sulfide (MnS), iron (II) sulfide (FeS), iron (II) sulfide ($FeS_2$), iron (III) sulfide ($Fe_2S_3$), chromium (III) sulfide ($Cr_2S_3$), copper (II) sulfide (CuS), nickel (II) sulfide (NiS), magnesium (II) sulfide (MgS), magnesium (II) acetate $Mg(OAc)_2$, and magnesium sulfate $MgSO_4$, magnesium chloride ($MgCl_2$), ammonium chloride ($NH_4Cl$), iron chloride ($FeCl_2$), calcium chloride ($CaCl_2$), sodium chloride (NaCl), sodium acetate (NaOAc), sodium carbonate ($Na_2CO_3$), lithium chloride (LiCl), lithium acetate (LiOAc), potassium chloride (KCl), ammonium acetate ($NH_4OAc$), aluminum acetate ($Al(OAc)_3$), basic aluminum acetate ($Al(OH)(OAc)_2$), dibasic aluminum acetate ($Al(OH)_2(OAc)$).

The slurry may comprise a solvent. Examples of solvents, which can be used alone or as a mixture of solvents, include protic solvents, aprotic solvents, polar solvents, and nonpolar solvents. Non-limiting examples of solvents include alcohols, such as water, methanol, ethanol, 1-propanol, and 2-propanol; aliphatic and aromatic hydrocarbons, such as pentane, hexane, cyclohexane, methlycyclohexane, benzene, toluene and xylene; ethers, such as diethyl ether, diethylene glycol dimethyl ether, tetrahydrofuran and dioxane; halogenated hydrocarbons, such as methylene chloride, chloroform, 1,1,2,2-tetrachloroethane and chlorobenzene; esters and lactones, such as ethyl acetate, butyrolactone and valerolactone; acid amides and lactams, such as dimethylformamide, dimethylacetamide and N-methylpyrrolidone, and ketones, such as acetone, dibutyl ketone, methyl isobutyl ketone and methoxyacetone.

A slurry may comprise an inert material which aids in dispersing the alloying agent in the solvent. The inert material may be in addition to other components of the slurry. The inert material may aid in controlling the viscosity of the slurry. For example, the inert material may increase viscosity by promoting hydrogen bonding between the activator and the solvent. In addition, hydrogen bonds may form between the inert material and the activator. Further, the inert material may prevent the alloying agent from dropping out of suspension. Further, the inert material may prevent "stickers" form forming during the annealing process.

Examples of inert material include, without limitation, alumina ($Al_2O_3$), silica ($SiO_2$), titanium dioxide ($TiO_2$), magnesium oxide (MgO), calcium oxide (CaO), bentonite clay, monterey clay, Kaolin clay, philosilicate clay, other clays, and combinations thereof. The inert material may include non-stoichiometric variants of such material.

The boiling point (or boiling temperature) of the solvent may be less than or equal to about 200° C., 190° C., 180° C., 170° C., 160° C., 150° C., 140° C., 130° C., 120° C., 110° C., or 100° C.

Chromium particles may be larger in size than other particles in the slurry, and can suspended without high polymer additions.

An organic binder, such as methyl cellulose and polyethylene oxide (PEO), may be added to the slurry. An inorganic binder, such as sodium silicate, may be added to the slurry.

Organic binders and inorganic binders may allow reduction of the amount of activator without sacrificing green strength and rheological properties.

The particle size of the inert material may be less than about 140 mesh. The particle size of the inert material may be less than or equal to about 200 mesh, 300 mesh, 400 mesh, 500 mesh, or 600 mesh. The particle size of the inert material may be less than or equal to about 200 mesh. The particle size may help facilitate removal of the inert material after annealing.

The properties of the slurry can be a function of one or more parameters used to form the slurry, maintain the slurry or apply the slurry. Such properties can include viscosity, shear thinning index, and yield stress. Such properties can include Reynolds number, viscosity, pH, and slurry component concentration. Parameters that can influence properties of the slurry can include water content, alloying agent identity and content, halide activator identity and content, and inert species identity and content, temperature, shear rate and time of mixing.

The present disclosure also provides methods for forming a slurry. The slurry can be formed by mixing various components of the slurry in a mixing chamber (or vessel). In some examples, the slurry is formed by mixing one or more solvents, one or more alloying agents, one or more halide activators and one or more inert species in the chamber. Such components may be mixed at the same time or sequentially. For example, a solvent is provided in the chamber and an alloying agent is subsequently added to the chamber.

FIG. 1 illustrates a method of forming a layer adjacent to a substrate. In operation 110, a slurry is prepared from a combination of an alloying agent, activator, solvent, and inert species, as described elsewhere herein. Such components can be added to a mixing vessel sequentially or simultaneously. Next, in operation 120, the slurry can be applied from the mixing vessel to the substrate. In operation 130, the solvent in the slurry is removed after application by heat or vacuum drying at 90° C.-175° C. for 10-60 seconds. In operation 140, the web or substrate material is rolled or otherwise prepared for thermal treatment. The mixing sequence is that water is loaded first, the salts are added next, the alumina next, and finally the chromium is added.

During slurry production, the alloying agent, the activator, the solvent, and the inert species may be mixed together. To prevent clumping, dry ingredients may be added to the solvent in controlled amounts. The inert material and alloying agent may be in dry powder form.

The blade used to mix the slurry components may be in the shape of a whisk, a fork, or a paddle. More than one blade may be used to mix the slurry components. Each blade may have different shapes or the same shape. Dry ingredients may be added to the solvent in controlled amounts to prevent clumping. A high shear rate may be needed to help control viscosity.

The slurry may exhibit thixotropic behavior, wherein the slurry exhibits a decreased viscosity when subjected to sheer strain. The shear thinning index of the slurry can be between about 1 to about 8. In order to achieve the target viscosity, mixing may occur at a high shear rate. The shear rate can be between about $1\ s^{-1}$ to about $10{,}000\ s^{-1}$ (or Hz). The shear rate may be about $1\ s^{-1}$, about $10\ s^{-1}$, about $100\ s^-$, about $1{,}000\ s^{-1}$, about $5{,}000\ s^{-1}$, or about $10{,}000\ s^{-1}$.

The shear rate of a slurry may be measured on various instruments. The shear rate may be measured on a TA Instruments DHR-2 rheometer, for example. The shear rate of a slurry may differ depending on the instrument used to perform the measurement.

In order to achieve the target or predetermined viscosity, mixing may occur for a period of time between 1 minute and 2 hours. Preferably, the time of mixing is less than 30 minutes. The viscosity of the slurry may decrease the longer the slurry is mixed. The time of mixing may correspond to the length of time needed to homogenize the slurry.

A properly mixed state may be a state where the slurry does not have water on the surface. A properly mixed state may be a state where there are no solids on the bottom of the vessel. The slurry may appear to be uniform in color and texture.

The desired viscosity of the slurry can be a viscosity that is suitable for roll coating. The viscosity of the slurry can be between about 1 centipoise (cP) to 5,000,000 cP. The viscosity of the slurry may be about 1 cP, about 5 cP, about 10 cP, about 50 cP, about 100 cP, about 200 cP, about 500 cP, about 1,000 cP, about 10,000 cP, about 100,000 cP, about 1,000,000 cP, or about 5,000,000 cP. The viscosity of the slurry may be from about 1 cP to 1,000,000 cP, or 100 centipoise cP to 100,000 cP. The viscosity of the slurry may depend on shear rate. The viscosity of the slurry may be between about 200 cP to about 10,000 cP, or about 600 cP to about 800 cP. The slurry may be between 100 cP and 200 cP in the application shear window that has shear rates between $1000\ s^{-1}$ and $1000000\ s^{-1}$. The capillary number of the slurry may be between about 0.01 to 10. The yield stress of a slurry may be between about 0 to 1 Pa.

The settling rate of the slurry may be stable to separation or sedimentation for greater than one minute, greater than 15 minutes, greater than 1 hour, greater than 1 day, greater than 1 month, or greater than 1 year. The settling rate of the slurry may refer to the amount of time the slurry is able to withstand, without mixing, before settling occurs, or before the viscosity increases to values that are not suitable for roll coating. Similarly, the shelf-life of the slurry may refer to the time that slurry can withstand, without mixing, before the slurry thickens to an extent unsuitable for roll coating. Even if the slurry settles and thickens, however, the slurry may be remixed to its initial viscosity. The thixotropic index of the slurry can be stable such that the slurry does not thicken to unsuitable levels at dead spots in the pan of a roll coating assembly.

The viscosity of the slurry can be controlled by controlling the extent of hydrogen bonding by adding acid to the slurry during mixing. In addition, acid or base may be added to the slurry during mixing in order to control the pH level of the slurry. The pH level of the slurry can be between about 3 to about 12. The pH level of the slurry can be about 5 to about 8. The pH level of the slurry can be about 3, about 4, about 5, about 6, about 7, about 8, about 9, about 10, about 11, or about 12. The pH level of the slurry may change as the slurry settles. Remixing the slurry after the slurry settles may return the pH level of the slurry to initial pH levels. Varying levels of binder, for example, metal acetate, may be added to a slurry to increase green strength in a slurry.

The fluidity of a slurry can be measured by a tilt test. A tilt test can be an indication of yield stress and viscosity. As an alternative, a rheometer may be used to measure the fluidity of the slurry.

The order in which the ingredients are added may be as follows: first, activator is added to solvent, then inert material is added; then, the alloying agent is added to the mixture. Acid can then be added to the mixture in order to control the pH level of the mixture. The method of addition may not be required to achieve acceptable slurry properties The drying time of the slurry can be sufficiently long such that the slurry remains wet during the roll coating process and does not dry until after a coating of the slurry is applied to the substrate. The slurry may not dry at room temperature. The slurry may become dry to the touch after subjecting the drying zone of a roll coating line to heat for around ten seconds. The temperature of heat applied may be around 120° C.

The specific gravity of the slurry can be about 1 to 10 g/cm$^3$. The green strength of the slurry can be such that the slurry is able to withstand roll coating such that the slurry coated substrate is not damaged. For example, a dry film of slurry, dried after roll-coating in the drying oven adjacent to the paint booth, may have a green strength that allows the film to survive a force that flexes the film, twenty times, in alternating negative and positive directions, to an arc with a diameter of 20 inches. The green strength of the dry film of slurry may further allow the film to pass a tape test with a small amount of powdering. The tape test may involve contacting a piece of tape with the surface of the coated material. The tape, once removed from the surface of the coated material, may be clear enough to allow one to see through any powder that had adhered to the tape.

After the slurry is prepared, it may be applied to a substrate through, for example, a roll coating process. The substrate may comprise metal such as iron, copper, aluminum, or any combination thereof. The substrate may comprise an alloy of metals. The alloy may include impurities. The substrate may comprise steel. The substrate may be a steel substrate. The substrate may comprise ceramic. The substrate may be devoid of free carbon. The substrate can be made from melt phase. The substrate may be in a cold reduced state, in a full hard state (e.g., not subjected to an annealing step after cold reduction), or in a hot rolled pickled state.

The surface of the substrate may be free of processing oxides. This may be achieved by conventional pickling. The surface of the substrate can be reasonably free of organic materials. The surface of the substrate may be reasonably free of organic materials after processing with commercially available cleaners.

Grain pinning particles may be added, removed, or withheld from the substrate during preparation of the substrate in order to control the grain size of the substrate. For example, grain pinners may be added to the substrate in order to keep the grain size small and to form pinning points. As another example, grain pinners may be withheld from the substrate to allow the grains to grow large and to allow for motor laminations. Grain pinners may be insoluble at the annealing temperatures.

Examples of grain pinning particles include an intermetallic, a nitride, a carbide, a carbonitride of titanium, aluminum, niobium, vanadium, and combinations thereof. Non-limiting examples of grain pinning particles include titanium nitride (TiN), titanium carbide (TiC), and aluminum nitride (AlN).

The slurry can be applied to the substrate by roll coating, split coating, spin coating, slot coating, curtain coating, slide coating, extrusion coating, painting, spray painting, electrostatic mechanisms, printing (e.g., 2-D printing, 3-D printing, screen printing, pattern printing), chemical vapor deposition, dipping, spraying, combinations thereof, or through any other suitable method.

The substrate may be pretreated before the slurry is applied to the substrate. The substrate may be pretreated by using chemicals to modify the surface of the substrate in order to improve adhesion of the slurry to the surface of the substrate. Examples of such chemicals include chromates and phosphates.

The slurry can be applied to the substrate by various approaches, such as roll coating. The roll coating process may begin by providing a substrate, such as a steel substrate. The substrate may be provided as a coil, coiled mesh, wire, pipe, tube, slab, mesh, dipped formed part, foil, plate, sheet for example, sheet could have a thickness anywhere from 0.001 inches to 0.100 inches, wire rope, or a rod, or threaded rod where a screw pattern has been applied to any length or thickness of rod. Next, the coiled substrate may be unwound. Next, the unwound steel substrate may be provided to roll coaters, which may be coated with slurry. Next, the roll coaters may be activated such that the roll coaters coat the substrate with the slurry. The substrate may be fed through the roll coaters through multiple cycles such that the slurry is applied to the substrate multiple times. Depending on the properties of the slurry, it may be desirable to apply multiple coatings of the slurry to the substrate. Multiple coatings of the slurry can be applied to the substrate in order to achieve the desired thickness of the slurry. Different slurry formulations may be used in each of the multiple coatings. The slurry may be applied in a manner such as to form a pattern on the substrate. The pattern may in the form of, for example, a grid, stripes, dots, welding marks, or any combinations thereof. Multiple coatings on the same substrate may form a split coat on a substrate.

After the slurry is applied to the substrate, the solvent in the slurry may be removed by heating, vaporization, vacuuming, or any combination thereof. After the solvent is driven off, the substrate may be recoiled. Next, the coiled slurry coated substrate may be annealed.

The slurry coated, coiled substrate may be placed in a retort and subjected to a controlled atmosphere during heat treatment. Removal of water may be necessary. Pulling vacuum to force hydrogen between wraps may be necessary. The annealing process may be via tight coil or loose coil annealing. Annealing the slurry coated substrate can allow the elemental species in the slurry to diffuse into or through the substrate. Up to about 100% wt of the elemental species may diffuse into or through the substrate upon annealing. Certain process conditions may afford only 1-5% of the elemental species diffusing from the coating into the substrate. Diffusion of the elemental species to the substrate may be aided by an activator in the slurry. To prevent loss of the activator during annealing, hydrochloric acid may be added to the annealing gas. Minimizing the partial pressure of activator in the reactor at high temperatures may maintain a low deposition rate that is essential for minimizing or stopping the formation of Kirkendall pores. Adding too much of an acidic activator may also cause corrosion of the coating equipment or the substrate. The annealing process may be a continuous annealing process.

The slurry-coated substrate may be incubated or stored under vacuum or atmospheric conditions prior to annealing. This occurs prior to annealing and may be useful in removing residual contaminants from the coating, for example, solvent or binder leftover from the coating process. The incubation period may last between about 10 seconds to about 5 minutes or may be more than about 5 minutes. The incubation period may be the time between coating and annealing, and may be the length of time needed to transport the coated article to the heat treatment facility or equipment. For example, the incubation period may last for about 10 seconds, about 30 seconds, about 1 minute, about 2 minutes, about 3 minutes, about 4 minutes, or about 5 minutes. The incubation temperature may range from about 50° C. to about 300° C. For example, the incubation temperature may be more than about 50° C., about 75° C., about 100° C., about 125° C., about 150° C., about 175° C., about 200° C., about 225° C., about 250° C., about 275° C., or about 300° C. After incubating, and prior to annealing, the dry film of slurry on the substrate can be maintained under vacuum conditions. The coating may be dry to the touch immediately following the drying step after the roll-coating process. Absorbed water or other contaminants may be present with the coating anytime between roll coating and annealing.

The annealing temperature may be about 800° C., 900° C., 1000° C., 1100° C., 1200° C., or 1300° C. The heating temperature during annealing can be about 800° C. to about 1300° C., such as about 900° C. to about 1000° C. The annealing atmosphere, may comprise hydrogen, nitrogen, argon. The annealing atmosphere can be a vacuum.

The total annealing time, including heating, can range from about 5 hours to about 200 hours. For example, the total annealing time can be more than about 5 hours, about 20 hours, about 40 hours, about 60 hours, about 80 hours, about 100 hours, about 120 hours, about 140 hours, about 160 hours, about 180 hours, or about 200 hours. The maximum temperature during the annealing process may be reached in about 1 hour to 100 hours. For example, the maximum temperature during the annealing process may be reached in about 1 hour, 10 hours, 20 hours, 30 hours, 40 hours, 50 hours, 60 hours, 70 hours, 80 hours, 90 hours, or 100 hours.

Large articles may have hot spots or cold spots during thermal treatment, where an article might be coated evenly but heated unevenly. Hot spots or cold spots may be denoted to control the diffusion of alloying element into the article as uniformly as possible.

A residue may remain on the substrate after the annealing process. The activator in the slurry may be consumed or removed (e.g., deposited on the walls of the retort), and the concentration of the alloying agent is reduced due to its diffusion onto and/or into the substrate. However, after annealing, other residue in the form of, e.g., a powder, may remain on the substrate. The residue may comprise the inert material from the slurry. This residue may be removed prior to further processing (e.g., temper rolling). The reaction can be purged with HCl gas to halt the reaction. The purging with HCl gas can allow for the formation of a flat profile.

After annealing, a layer may be formed on the substrate. The layer may have at least one elemental species. The layer may be an outer layer with at least one elemental species having a concentration that varies by less than about 20 wt. %, about 15 wt. %, about 10 wt. %, about 5 wt. %, about 4 wt. %, about 3 wt. %, about 2 wt. %, about 1 wt. %, or about 0.5 wt. % in the outer layer. The substrate may comprise a bonding layer adjacent the outer layer. The elemental species may have a concentration that decrease to less than about 1.0 wt % in the boding layer. The layer may comprise stainless steel. The substrate can be substantially free of Kirkendall voids after annealing. The layer can impart characteristics on the substrate which the substrate did not previously contain. For example, the layer may make the substrate harder, more wear resistant, more aesthetically pleasing, more electrically resistive, less electrically resistive, more thermally conductive, or less thermally conductive. In addition, the layer may cause the speed of sound in the substrate to be faster or slower.

The present disclosure provides objects (e.g., sheets, tubes or wires) coated with one or metal layers. A metal layer may include one or more metals. In some cases, a substrate may be coated with a metal layer. The coating may comprise an alloying agent having at least one elemental metal. A slurry-coated substrate may be formed when a substrate is coated with a slurry comprising an alloying agent having at least one elemental metal. A substrate that has been coated with an alloying agent may be subjected to annealing conditions. The metal layer may be coupled to a substrate with the aid of a diffusion layer between the metal layer and the substrate.

The amount of an alloying agent in a diffusion layer may change with depth. The amount of an alloying agent in a diffusion layer may have a change with depth at a certain rate, such as about −0.01% per micrometer, about −0.01% per micrometer, about −0.01% per micrometer, about −0.05% per micrometer, about −0.1% per micrometer, about −0.5% per micrometer, about −1.0% per micrometer, about −3.0% per micrometer, about −5.0% per micrometer, about −7.0% per micrometer, or about −9.0% per micrometer. The amount of an alloying agent in a diffusion layer may have a change with depth from about −0.01% per micrometer to −5.0% per micrometer, or from about −0.01% per micrometer to −3.0% per micrometer. X-ray photoelectron spectroscopy may be used to measure such change in amount (or concentration) with depth.

An alloying agent may have a concentration of at least about 5 wt % at a depth of less than or equal to 100 micrometers, about 10 wt % at a depth of less than or equal to 30 micrometers, about 15 wt % at a depth of less than or equal to 50 micrometers, or about 15 wt % at a depth of less than or equal to 10 micrometers from the surface of the substrate.

A concentration of an alloying agent in a metal layer may be at most about 20 wt. % over a depth of about greater than 100 micrometers, 15 wt. % over a depth of about greater than 110 micrometers, about 10 wt. % over a depth of about 125 micrometers, 8 wt. % over a depth of about greater than 140 micrometers, or about 6 wt. % over a depth of about 150 micrometers from the surface of the substrate.

A concentration of an alloying agent in a metal layer may decrease over a certain depth as a result of annealing of a metal layer on a substrate. A concentration of an alloying agent in a metal layer may decrease by no more than about 50 wt. % over a depth of about 100 micrometers, about 40 wt. % over a depth of about 90 micrometers, about 30 wt. % over a depth of about 70 micrometers, about 25 wt. % over a depth of about 60 micrometers, or about 20 wt. % over a depth of about 50 micrometers.

A metal layer that is coated onto a substrate may have a certain thickness after the metal layer is annealed onto the substrate. A metal layer that is coated onto a substrate may have a thickness less than about 1 millimeter, about 900 micrometers, about 800 micrometers, about 700 micrometers, about 600 micrometers, about 500 micrometers, 400 micrometers, about 300 micrometers, about 200 micrometers, or about 100 micrometers.

Other properties of substrates coated with metal layers may be as described in, for example, U.S. Patent Publication No. 2013/0171471; U.S. Patent Publication No. 2013/0309410; U.S. Patent Publication No. 2013/0252022; U.S. Patent Publication No. 2015/0167131; and U.S. Patent Publication No. 2015/0345041, each of which is incorporated herein by reference in its entirety.

Another aspect of the present disclosure is a method for forming a metal-containing object comprising a metal layer adjacent to a substrate. The metal-containing object may be devoid of a material discontinuity between an outer layer of the metal-containing object and the substrate.

Computer Control Systems

Figure 28:
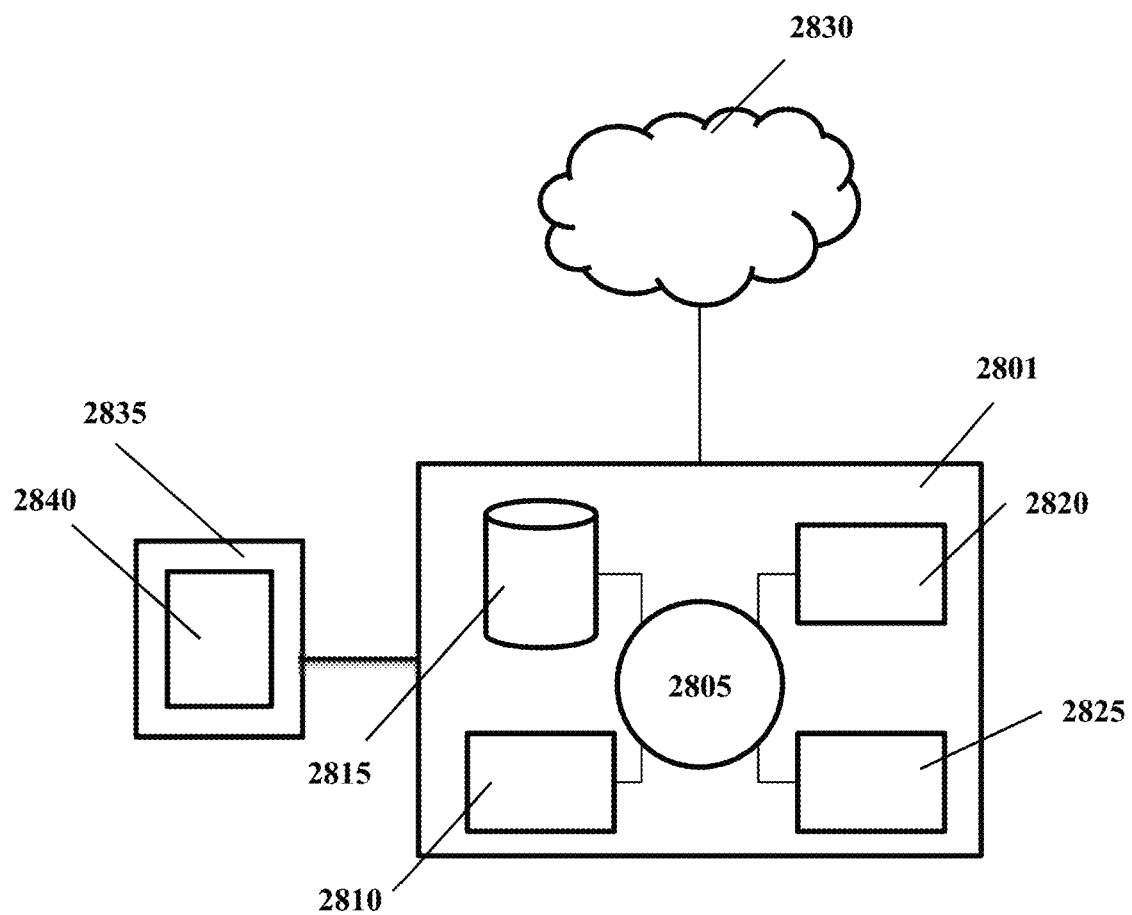
FIG. 28 shows a computer control system that is programmed or otherwise configured to implement methods provided herein.

The present disclosure provides computer control systems that are programmed to implement methods of the disclosure. FIG. 28 shows a computer control system 2801 that is programmed or otherwise configured to produce the slurry and/or apply a coating of the slurry to a substrate. The computer control system 2801 can regulate various aspects of the methods of the present disclosure, such as, for example, methods of producing the slurry and methods of applying a coating of the slurry to the substrate. The computer control system 2801 can be implemented on an electronic device of a user or a computer system that is remotely located with respect to the electronic device. The electronic device can be a mobile electronic device.

The computer system 2801 includes a central processing unit (CPU, also "processor" and "computer processor" herein) 2805, which can be a single core or multi core processor, or a plurality of processors for parallel processing. The computer control system 2801 also includes memory or memory location 2810 (e.g., random-access memory, read-only memory, flash memory), electronic storage unit 2815 (e.g., hard disk), communication interface 2820 (e.g., network adapter) for communicating with one or more other systems, and peripheral devices 2825, such as cache, other memory, data storage and/or electronic display adapters. The memory 2810, storage unit 2815, interface 2820 and peripheral devices 2825 are in communication with the CPU 2805 through a communication bus (solid lines), such as a motherboard. The storage unit 2815 can be a data storage unit (or data repository) for storing data. The computer control system 2801 can be operatively coupled to a computer network ("network") 2830 with the aid of the communication interface 2820. The network 2830 can be the Internet, an internet and/or extranet, or an intranet and/or extranet that is in communication with the Internet. The network 2830 in some cases is a telecommunication and/or data network. The network 2830 can include one or more computer servers, which can enable distributed computing, such as cloud computing. The network 2830, in some cases with the aid of the computer system 2801, can implement a peer-to-peer network, which may enable devices coupled to the computer system 2801 to behave as a client or a server.

The CPU 2805 can execute a sequence of machine-readable instructions, which can be embodied in a program or software. The instructions may be stored in a memory location, such as the memory 2810. The instructions can be directed to the CPU 2805, which can subsequently program or otherwise configure the CPU 2805 to implement methods of the present disclosure. Examples of operations performed by the CPU 2805 can include fetch, decode, execute, and writeback.

The CPU 2805 can be part of a circuit, such as an integrated circuit. One or more other components of the system 2801 can be included in the circuit. In some cases, the circuit is an application specific integrated circuit (ASIC).

The storage unit 2815 can store files, such as drivers, libraries and saved programs. The storage unit 2815 can store user data, e.g., user preferences and user programs. The computer system 2801 in some cases can include one or more additional data storage units that are external to the computer system 2801, such as located on a remote server that is in communication with the computer system 2801 through an intranet or the Internet.

The computer system 2801 can communicate with one or more remote computer systems through the network 2830. For instance, the computer system 2801 can communicate with a remote computer system of a user (e.g., a user controlling the manufacture of a slurry coated substrate). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 2801 via the network 2830.

Methods as described herein can be implemented by way of machine (e.g., computer processor) executable code stored on an electronic storage location of the computer system 2801, such as, for example, on the memory 2810 or electronic storage unit 2815. The machine executable or machine readable code can be provided in the form of software. During use, the code can be executed by the processor 2805. In some cases, the code can be retrieved from the storage unit 2815 and stored on the memory 2810 for ready access by the processor 2805. In some situations, the electronic storage unit 2815 can be precluded, and machine-executable instructions are stored on memory 2810.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 2801, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 2801 can include or be in communication with an electronic display 2835 that comprises a user interface (UI) 2840 for providing, for example, parameters for producing the slurry and/or applying the slurry to a substrate. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 2805. The algorithm can, for example, regulate the mixing shear rate of the slurry, the amount of each ingredient added to the slurry mixture, and the order in which the ingredients are added to the slurry mixture. As another example, the algorithm can regulate the speed at which the slurry is applied to the substrate and the number of coatings of slurry applied to the substrate.

EXAMPLES

Example 1

In an example, a slurry is formed by mixing water, an alloying agent, a halide activator and an inert species in a mixing chamber, the preferred species being chromium, magnesium chloride hexahydrate, and alumina. These components are added to the mixing chamber while mixing a resulting solution. The shear rate of mixing can be varied, and properties such as viscosity and yield stress are recorded, listed, and shown in FIG. 2-FIG. 6.

The amount of water added to the slurry is varied to form a number of slurries, and the resulting effect on properties of the slurries is recorded. Next, the slurry is applied to a carbon steel substrate via a roll coating process. The slurry is then annealed at 200° C. for 2 hours. The slurry is then dried to completeness between about 2 hours to about 100 hours or longer. The atmosphere near the chromized article's surface may be below −20° F. dew point.

Example 2

In another example, a slurry is formed by mixing various components of the slurry in a mixing chamber. The slurry is formed by mixing a solvent, such as water, an alloying agent, such as iron silicate, a halide activator, such as iron chloride, and an inert species, such as chromium, in a high shear mixer. Shear rate is varied, and properties such as viscosity and yield stress are recorded and listed in FIG. 7-FIG. 10. The amount of chromium added to the slurry is varied to form a number of slurries, and the resulting effect on properties of the slurries is recorded. The slurry is then applied to a substrate roll coating. The slurry is dried on the substrate that brings the substrate to a temperature between 70° C. to 120° C. for a time between 20 seconds and 120 seconds. The excess slurry is removed before subsequent processing.

Example 3

In another example, a slurry is formed by mixing various components of the slurry in a mixing chamber. The slurry is formed by mixing a solvent, such as water, an alloying agent, such as iron silicate, a halide activator, such as iron chloride, and an inert species, such as aluminum (III) oxide, in a chamber. Shear rate is varied, and properties such as viscosity and yield stress are recorded and listed in FIG. 12-FIG. 14. The amount of alumina added to the slurry is varied to form a number of slurries, and the resulting effect on properties of the slurries is recorded. The slurry is then applied to a substrate via a single step process. The slurry is dried on the substrate that brings the substrate to a temperature between 70° C. to 120° C. for a time between 20 seconds and 120 seconds. The excess slurry is removed before subsequent processing.

Example 4

In another example, a slurry is formed by mixing various components of the slurry in a mixing chamber. The slurry is formed by mixing a solvent, such as water, an alloying agent, such as ferro-silicon, a halide activator, such as iron chloride, and an inert species, such as alumina, in a chamber. Shear rate is varied, and properties such as viscosity, yield stress, fluidity, and pH are recorded and listed in FIG. 16-FIG. 18, FIG. 21 and FIG. 22. The amount of magnesium chloride added to the slurry is varied to form a number of slurries, and the resulting effect on properties of the slurries is recorded.

Example 5

In another example, a slurry is formed, comprising 15 g chromium, 5.25 g alumina, 0.25 g $MgCl_2 \cdot 6H_2O$, and water in amounts from 4.2 g to 5.4 g in 0.2 g increments. These components are added to the mixing chamber while mixing a resulting solution. The shear rate of mixing can be varied, and properties such as viscosity and yield stress are recorded, listed, and shown in FIG. 2-FIG. 6.

Figure 2:
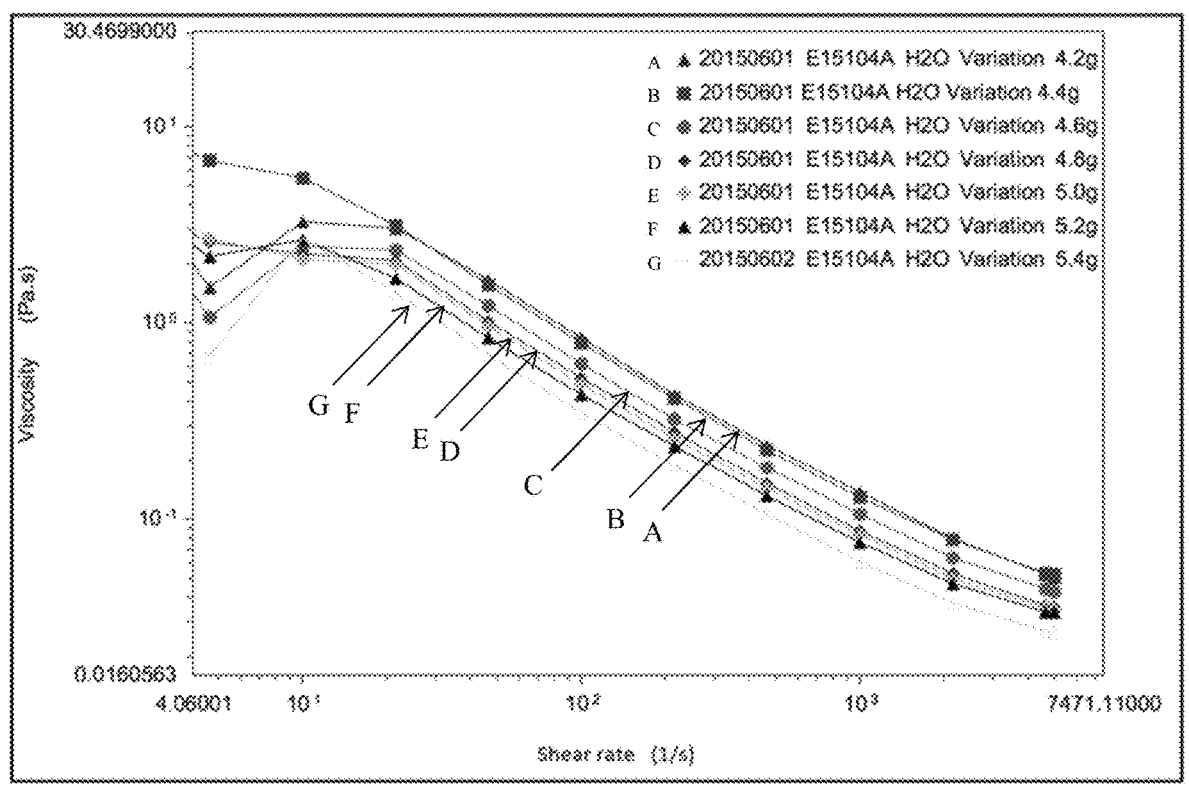
FIG. 2 shows change in viscosity as a result of varying shear rate for a slurry with varying amounts of water.
Figure 3:
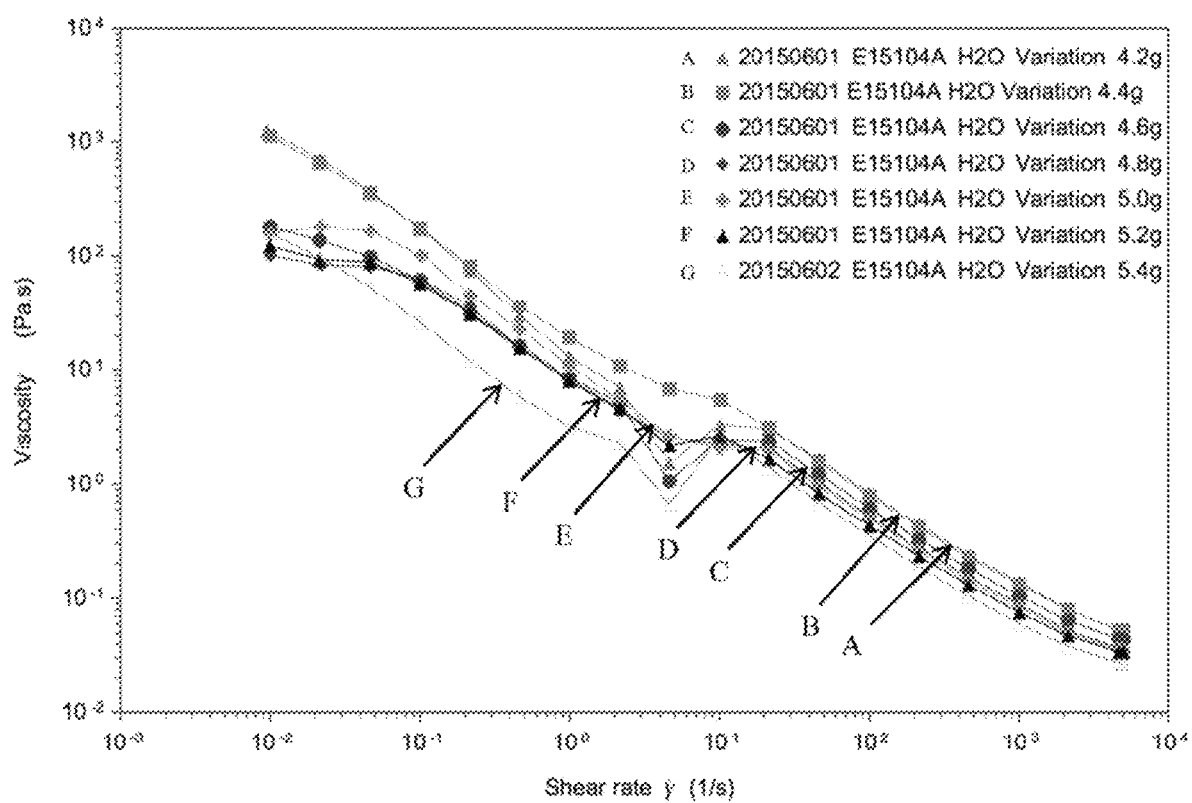
FIG. 3 shows change in viscosity as a result of varying shear rate for the slurry with varying amounts of water.

FIGS. 2 and 3 illustrate examples in which varying amounts of water can affect the viscosity of a slurry. The figures show various curves A-G in which viscosity may decrease with increasing shear rate. The curves are in order of increasing water content. For example, curve A has a water content of 4.2 grams (g) and curve G has a water content of 5.4 g. Generally, increasing the shear rate can decrease the viscosity of the slurry. Increasing the amount of water can decrease the viscosity of the slurry. In some cases, the slurry can have a viscosity from about $1 \times 10^{-2}$ pascal (Pa) second to 100 Pa second at a shear rate from about $0.01 \text{ s}^{-1}$ to $1,000 \text{ s}^{-1}$. For example, the slurry can have a viscosity of 10 Pa second at $4 \text{ s}^{-1}$ or $1 \times 10^{-2}$ Pa second at $7400 \text{ s}^{-1}$.

Figure 4:
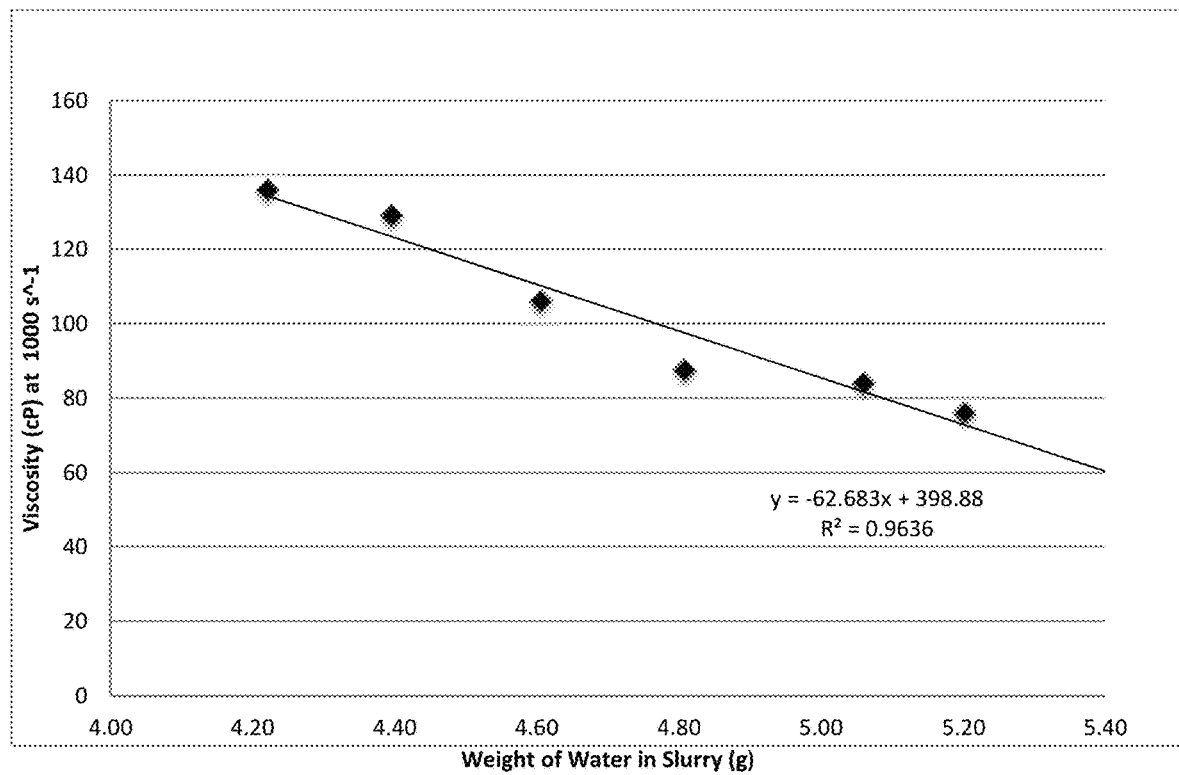
FIG. 4 shows change in viscosity as a result of varying amounts of water for the slurry.

The viscosity of the slurry can be a function of the weight of water in the slurry. FIG. 4 illustrates change in viscosity at a fixed shear rate ($1000 \text{ s}^{-1}$) as a result of varying amounts of water of a slurry. An increase of weight of water in the slurry can decrease the viscosity of the slurry. The decrease may be linear. In some examples, the viscosity of the slurry at a shear rate of $1000 \text{ s}^{-1}$ can be from about 140 centipoise (cP) at a weight of water in the slurry of about 4.2 g to 60 cP at a water weight of 5.4 g.

Figure 5:
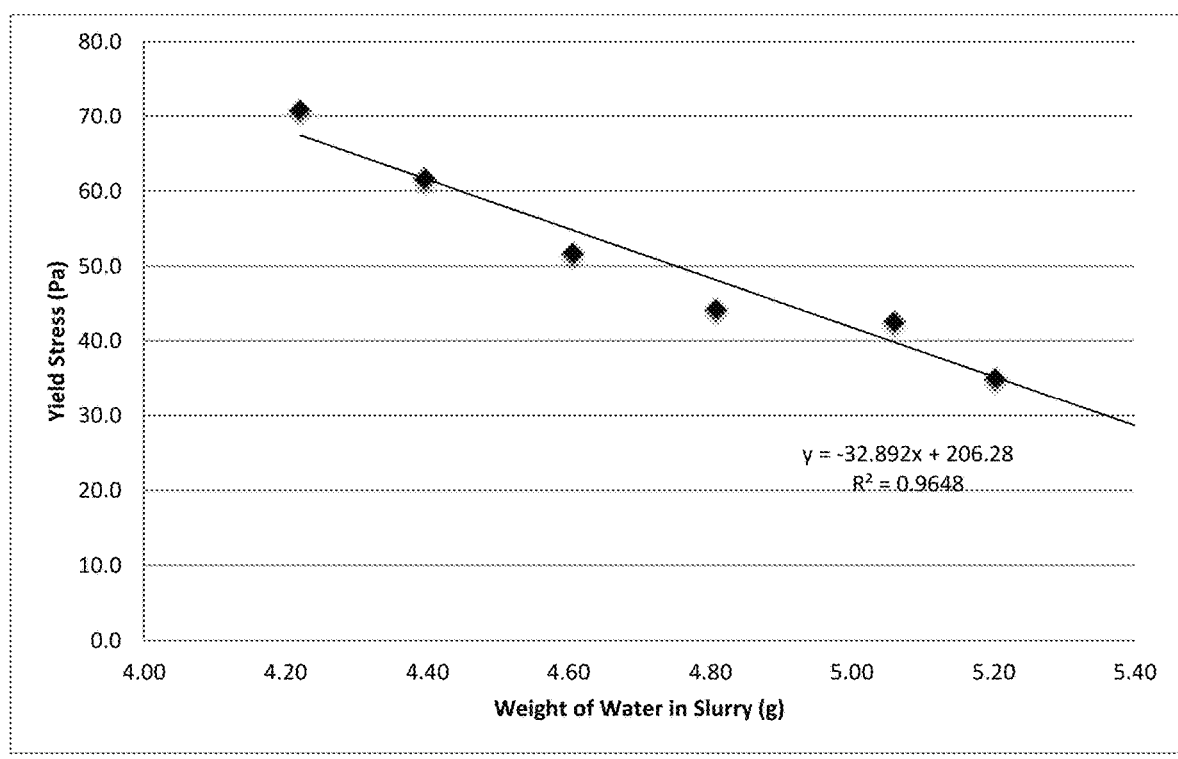
FIG. 5 shows change in yield stress as a result of varying amounts of water for the slurry.

The yield stress of the slurry can be a function of the weight of water in the slurry. FIG. 5 illustrates change in yield stress as a result of varying amounts of water of a slurry. An increase of weight of water in the slurry can decrease the yield stress of the slurry. The decrease may be linear. In some examples, the yield stress of the slurry can be about 70 pascal (Pa) at a weight of water in the slurry of about 4.2 g to about 30 Pa at a water weight of 5.4 g.

FIG. 6 illustrates change in viscosity, shear thinning index, and yield stress as a result of varying amounts of water. Generally, increasing the amount of water in the slurry can decrease the viscosity of the slurry. The decrease may be linear. In some examples, the viscosity of the slurry at a shear rate of 1000 s$^{-1}$ can be from about 136 centipoise (cP) at a weight of water in the slurry of about 4.2 g to 61 cP at a water weight of 5.4 g. Generally, increasing the amount of water in a slurry can decrease the shear thinning index of the slurry. The decrease may be linear. In some examples, the shear thinning index can be from about 6.1 (100:1000 s$^{-1}$) at a weight of water in the slurry of about 4.2 g to about 5.8 at a water weight of 5.4 g. An increase of weight of water in a slurry can decrease the yield stress of the slurry. The decrease may be linear. In some examples, the yield stress of the slurry can be about 71 pascal (Pa) at a weight of water in the slurry of about 4.2 g to about 30 Pa at a water weight of 5.4 g.

Example 6

Figure 7:
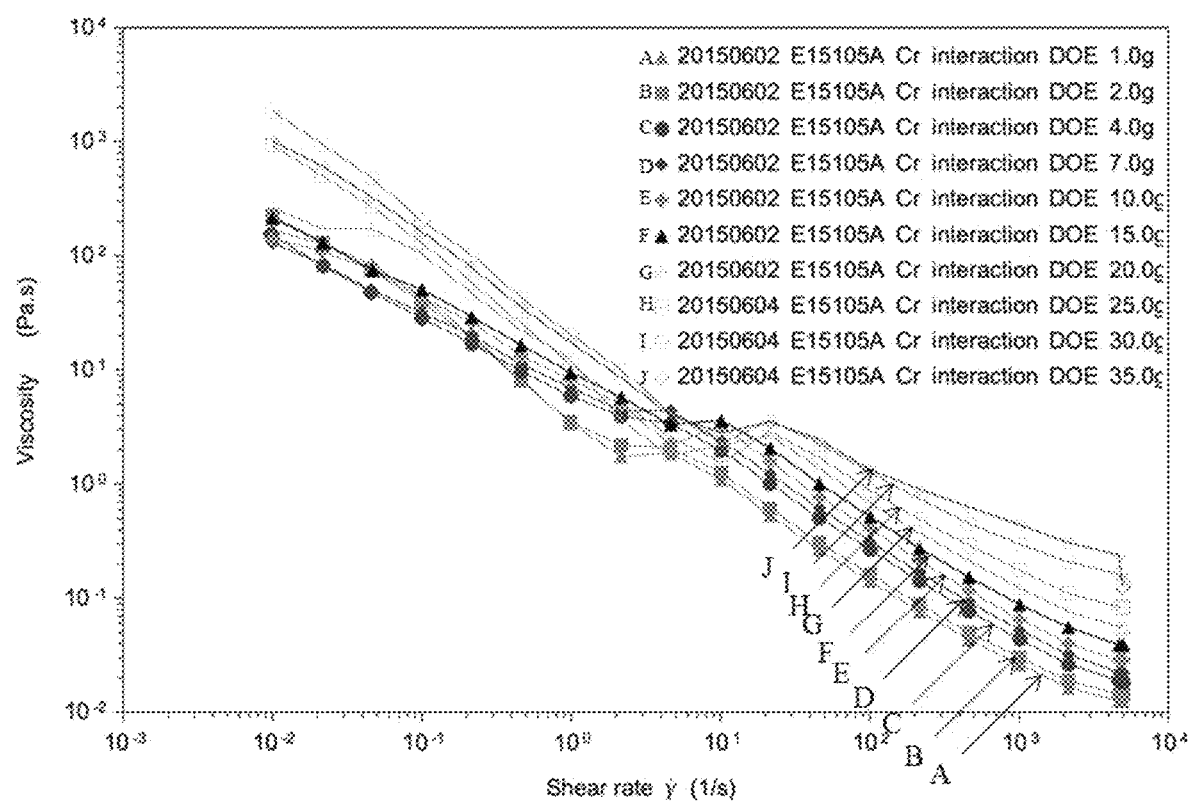
FIG. 7 shows change in viscosity as a result of varying shear rate for a slurry with varying amounts of chromium.

The viscosity of a slurry can be a function of the weight of an alloying agent in the slurry, such as chromium. FIG. 7 illustrates an example in which varying amounts of chromium can affect the viscosity of a slurry. A slurry is formed, comprising 5 g water, 5.25 g alumina, 0.25 g MgCl$_2$·6H$_2$O, and chromium in amounts between 1 g and 35 g. The figure shows various curves A-J in which viscosity may decrease with increasing shear rate. The curves are in order of increasing chromium content. For example, curve A has a chromium content of 1.0 grams (g) and curve J has a water content of 35.0 g. Generally, increasing the shear rate can decrease the viscosity of the slurry. Increasing the amount of chromium can decrease the viscosity of the slurry. In some cases, the slurry can have a viscosity from about 1×10$^{-2}$ pascal (Pa) second to 100 Pa second at a shear rate from about 0.01 s$^{-1}$ to 1,000 s$^{-1}$. For example, the slurry can have a viscosity of 1,000 Pa second at 0.01 s$^{-1}$. For example, the slurry can have a viscosity of 1×10$^{-2}$ Pa second at 1,000 s$^{-1}$.

The viscosity, shear thinning index, and yield stress of the slurry can be a function of the weight of an alloying agent in the slurry, such as chromium. FIG. 8 illustrates change in viscosity, shear thinning index, and yield stress as a result of varying amounts of chromium. Generally, increasing the amount of chromium in a slurry can increase the viscosity of the slurry. The increase may be exponential. In some examples, the viscosity of the slurry at a shear rate of 1000 s$^{-1}$ can be from about 26 centipoise (cP) at a weight of chromium in the slurry of about 1.0 g to 442 cP at a chromium weight of 35.0 g. Generally, increasing the amount of chromium in a slurry can decrease the shear thinning index of the slurry. The decrease may be linear. In some examples, the shear thinning index can be from about 42 (10:1000 s$^{-1}$) at a weight of chromium in the slurry of about 1.0 g to about 6 at a chromium weight of 35.0 g. In some examples, the shear thinning index can be from about 5.5 (100:1000 s$^{-1}$) at a weight of chromium in the slurry of about 1.0 g to about 3.0 at a chromium weight of 35.0 g. An increase of weight of chromium in a slurry can increase the yield stress of the slurry. The increase may be linear. In some examples, the yield stress of the slurry can be about 10 pascal (Pa) at a weight of chromium in the slurry of about 1.0 g to about 104 Pa at a chromium weight of 35.0 g.

Figure 9:
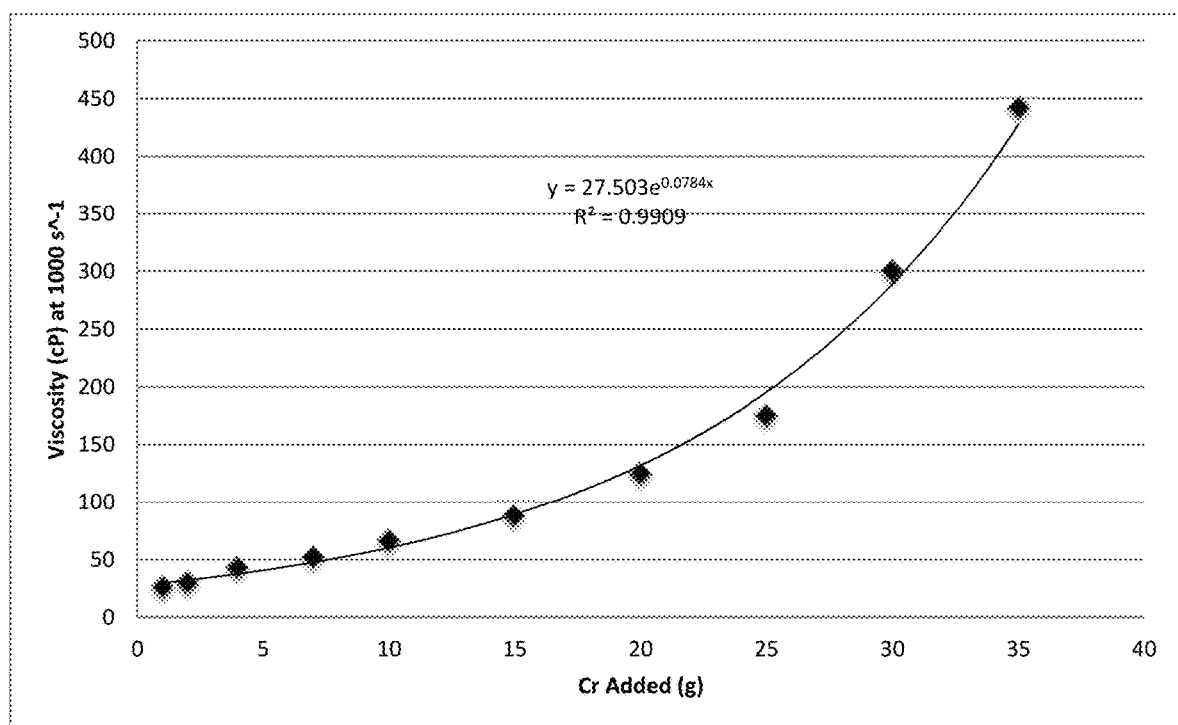
FIG. 9 shows change in viscosity as a result of varying amounts of chromium for a slurry.

The viscosity of the slurry can be a function of the weight of an alloying agent in the slurry, such as chromium. FIG. 9 illustrates change in viscosity at a fixed shear rate (1000 s$^{-1}$) as a result of varying amounts of chromium of the slurry. An increase of chromium in a slurry can increase the viscosity of the slurry. The increase may be exponential. In some examples, the viscosity of the slurry at a shear rate of 1000 s$^{-1}$ can be from about 25 centipoise (cP) at a weight of chromium in the slurry of about 1.0 g to about 450 cP at a chromium weight of 35.0 g.

Figure 10:
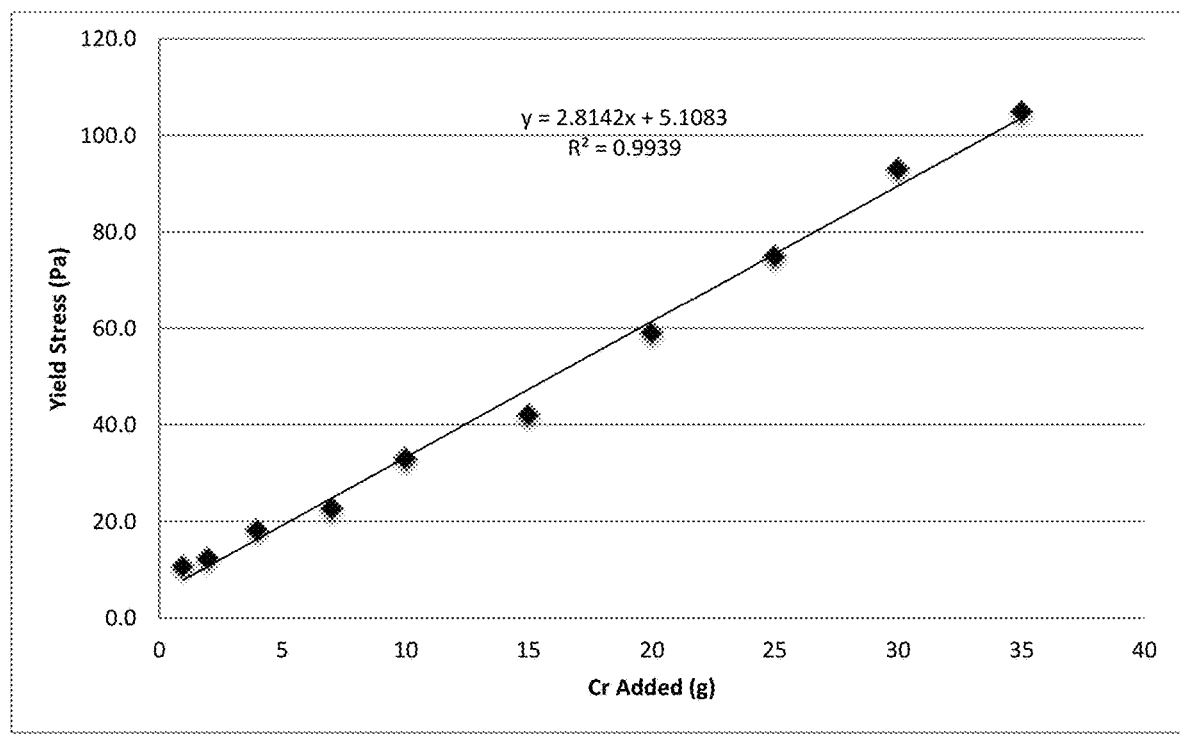
FIG. 10 shows change in yield stress as a result of varying amounts of chromium for a slurry.

The yield stress of the slurry can be a function of the weight of alloying agent (e.g., chromium) in the slurry. FIG. 10 illustrates change in yield stress as a result of varying amounts of chromium in the slurry. An increase of chromium in the slurry can increase the yield of the slurry. The increase may be linear. In some examples, the yield stress of the slurry can be about 10 pascal (Pa) at a weight of chromium in the slurry of about 1.0 g to about 100 Pa at a chromium weight of 35.0 g.

Figure 11:
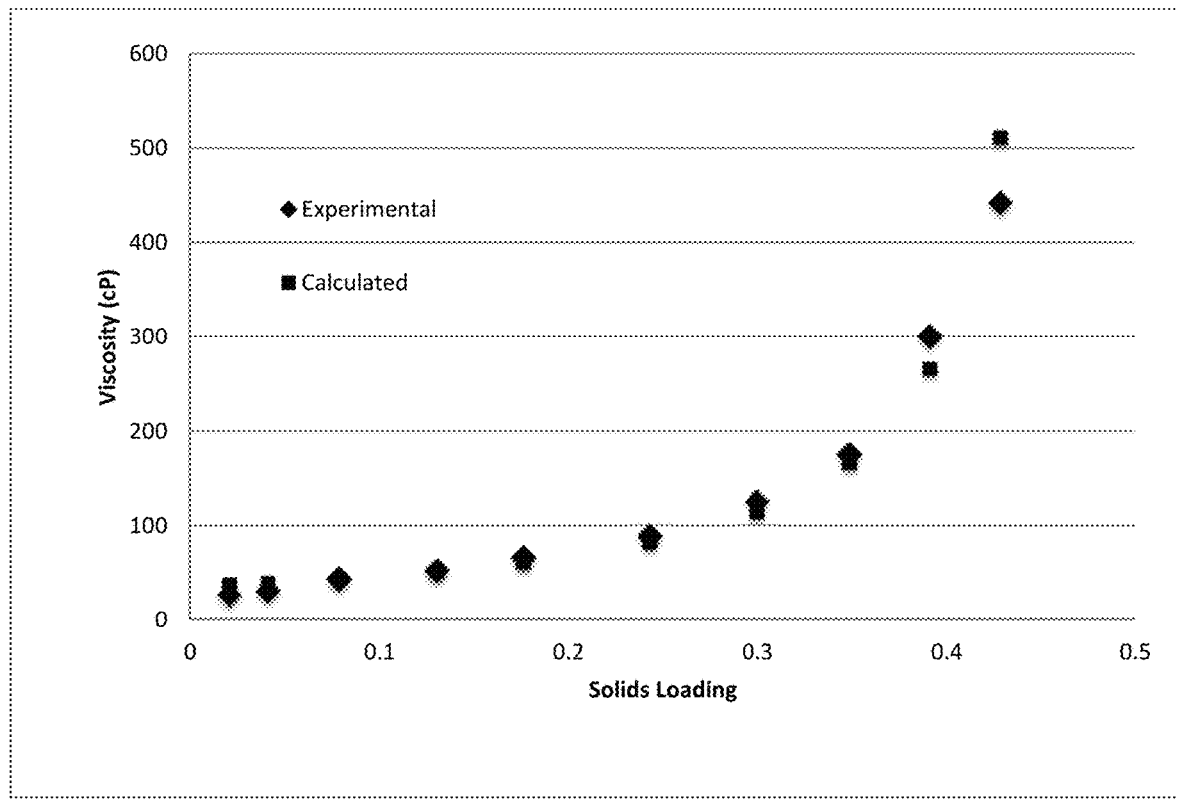
FIG. 11 shows a calculated and an experimental Krieger-Dougherty fit of chromium loading to viscosity for a slurry.

FIG. 11 illustrates experimental data and a calculated Krieger-Dougherty fit of chromium loading to viscosity for a slurry. The experimental data and calculated Krieger-Dougherty fit of chromium loading to viscosity for a slurry may correspond well. An increase of chromium in a slurry can increase the viscosity of the slurry. The increase may be exponential.

Example 7

Various properties of a slurry can be selected or tailored as desired. Such properties can include viscosity, shear thinning index, and yield stress. In some examples, these properties can change with alumina content.

In another example, a slurry is formed, comprising about 5 g water, 15 g chromium, 0.25 g MgCl$_2$·H$_2$O, and alumina in amounts from 4.5 g to 7.5 g in 0.5 g increments. FIG. 12 illustrates change in viscosity, shear thinning index, and yield stress as a result of varying amounts of alumina. Generally, increasing the amount of alumina in a slurry can increase the viscosity of the slurry. The increase may be exponential. In some examples, the viscosity of the slurry at a shear rate of 1000 s$^{-1}$ can be from about 57 centipoise (cP) at a weight of alumina in the slurry of about 4.5 g to 203 cP at a chromium weight of 7.5 g. Generally, increasing the amount of alumina in a slurry can decrease the shear thinning index of the slurry. In some examples, the shear thinning index can be from about 42 (10:1000 s$^{-1}$) at a weight of alumina in the slurry of about 4.5 g to about 14 at an alumina weight of 7.5 g. In some examples, the shear thinning index can be from about 5.6 (100:1000 s$^{-1}$) at a weight of alumina in the slurry of about 4.5 g to about 5.9 at an alumina weight of 7.5 g. An increase of weight of alumina in a slurry can increase the yield stress of the slurry. In some examples, the yield stress of the slurry can be about 26 pascal (Pa) at a weight of alumina in the slurry of about 4.5 g to about 104 Pa at an alumina weight of 7.5 g.

Figure 13:
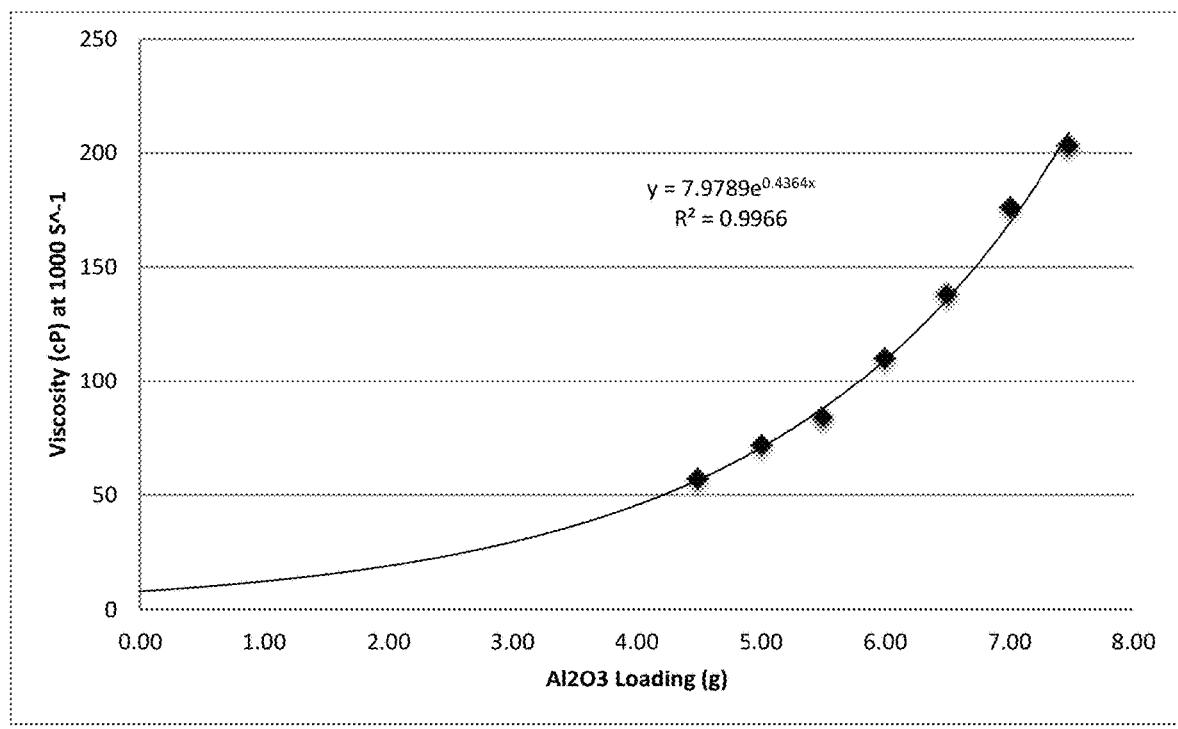
FIG. 13 shows change in viscosity for a slurry as a result of varying amounts of aluminum (III) oxide.

The viscosity of the slurry can be a function of the weight of an inert (e.g. alumina) in the slurry. FIG. 13 illustrates change in viscosity at a fixed shear rate (1000 s$^{-1}$) as a result of varying amounts of alumina of a slurry. An increase of alumina in a slurry can increase the viscosity of the slurry.

The increase may be exponential. In some examples, the viscosity of the slurry at a shear rate of 1000 s$^{-1}$ can be from about 50 centipoise (cP) at a weight of alumina in the slurry of about 4.5 g to about 200 cP at an alumina weight of 7.5 g. Though not wishing to be bound by mechanistic theory, higher amounts of aluminum (III) oxide in a slurry may interact chemically with the slurry to change structural or physical properties.

Figure 14:
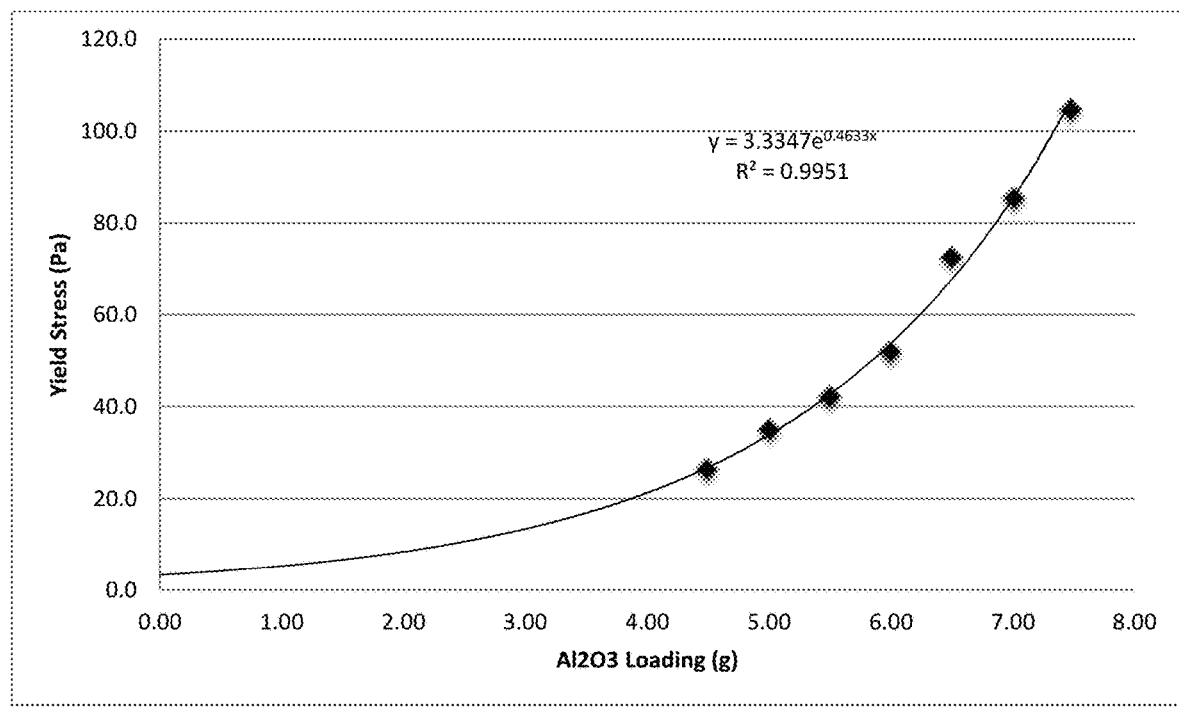
FIG. 14 shows change in yield stress for a slurry as a result of varying amounts of aluminum (III) oxide.

The yield stress of the slurry can be a function of the weight of an inert (e.g. aluminum oxide) in the slurry. FIG. 14 illustrates change in yield stress as a result of varying amounts of aluminum (III) oxide of a slurry. An increase of aluminum (III) oxide in a slurry can increase the yield of the slurry. The increase may be exponential. In some examples, the yield stress of the slurry can be about 25 pascal (Pa) at a weight of alumina in the slurry of about 4.5 g to about 100 Pa at an alumina weight of 7.5 g.

Figure 15:
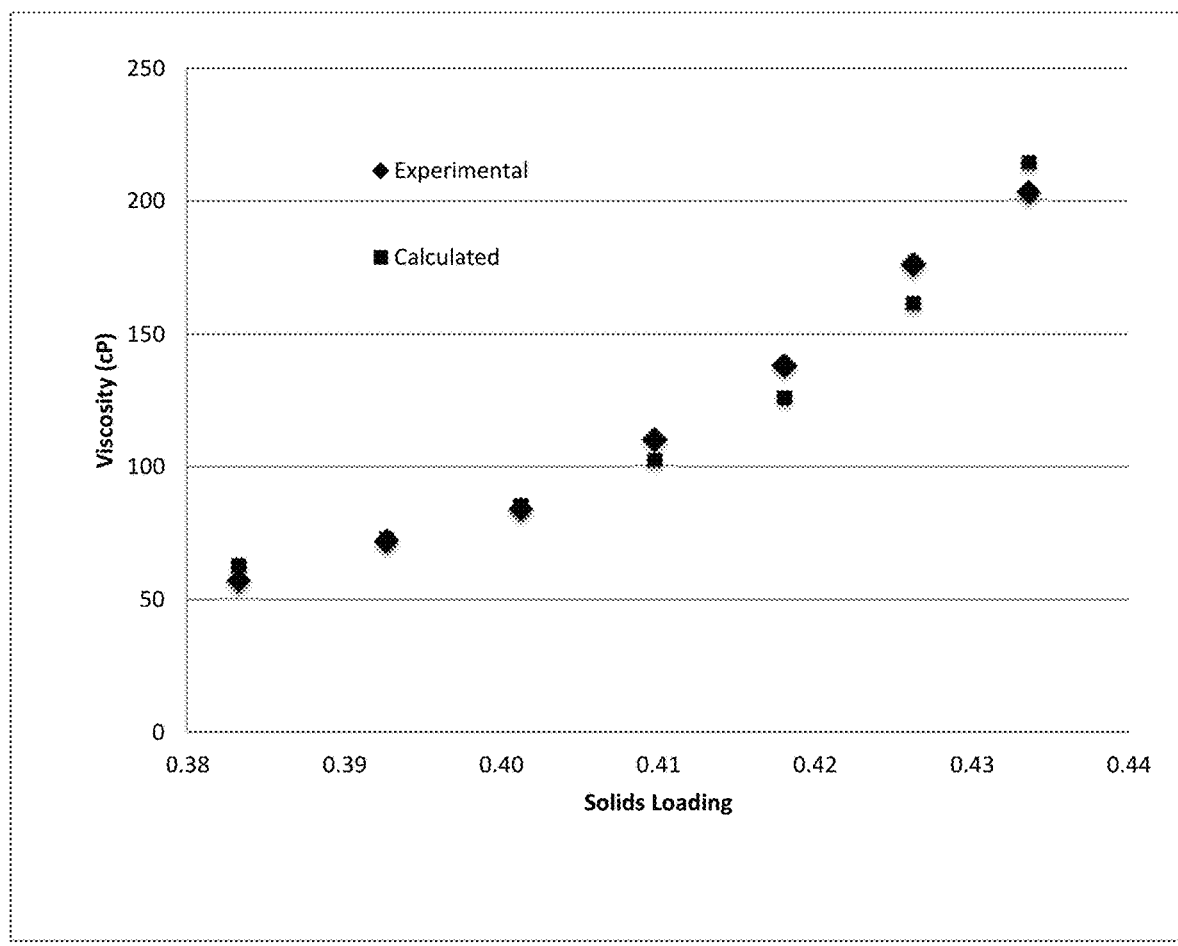
FIG. 15 shows a calculated and an experimental Krieger-Dougherty fit of aluminum (III) oxide loading to viscosity for a slurry.
Figure 17:
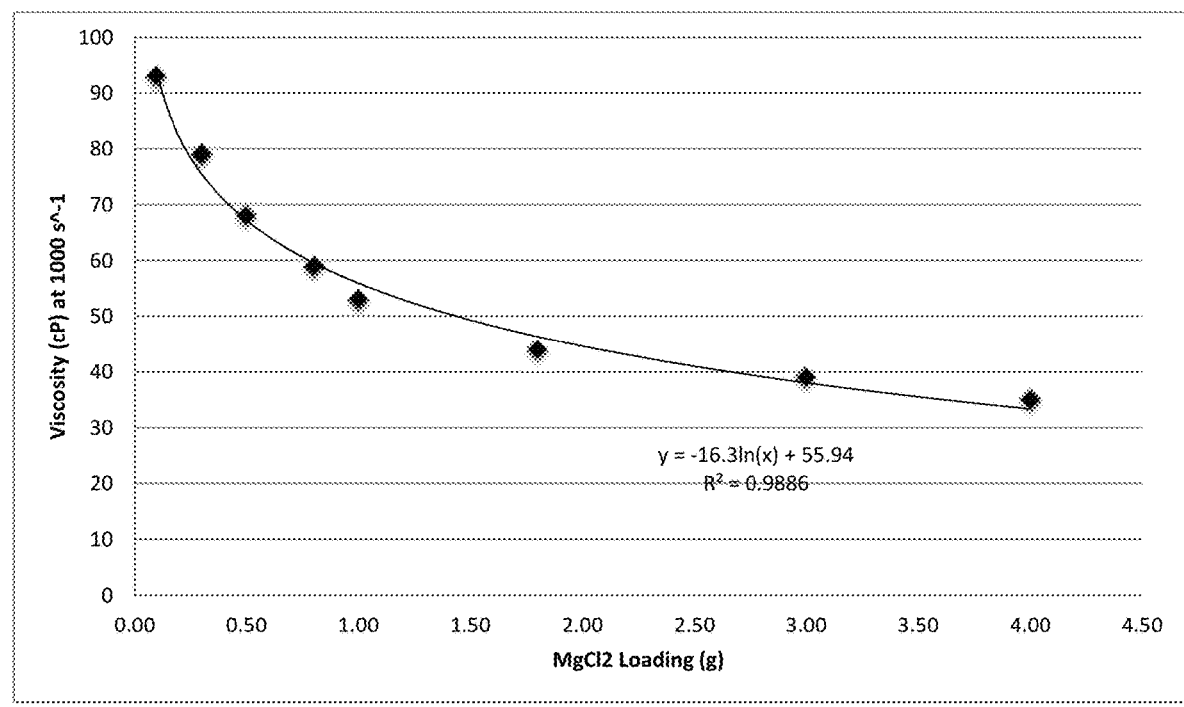
FIG. 17 shows change in viscosity as a result of varying amounts of magnesium chloride for a slurry.

FIG. 15 illustrates a calculated and an experimental Krieger-Dougherty fit of aluminum (III) oxide loading to viscosity for a slurry. The experimental data and calculated Krieger-Dougherty fit of aluminum (III) oxide loading to viscosity for a slurry may correspond well. An increase of aluminum in a slurry can increase the viscosity of the slurry. The increase may be linear or exponential.

Example 9

Slurry properties can change with the content of an activator (e.g. magnesium chloride). FIG. 16 illustrates change in viscosity, shear thinning index, and yield stress as a result of varying amounts of magnesium chloride. Generally, increasing the amount of magnesium chloride in a slurry can decrease the viscosity of the slurry. The decrease may be exponential or logarithmic. In some examples, the viscosity of the slurry at a shear rate of 1000 s$^{-1}$ can be from about 93 centipoise (cP) at a weight of magnesium chloride in the slurry of about 0.1 g to 35 cP at a magnesium chloride weight of 4 g. Generally, increasing the amount of magnesium chloride in a slurry can change the shear thinning index of the slurry. In some examples, the shear thinning index can be from about 16 (10:1000 s$^{-1}$) at a weight of alumina in the slurry of about 0.1 g to about 42 at a magnesium chloride weight of 0.8 g to about 16 at a magnesium chloride weight of 4 g. In some examples, the shear thinning index can be from about 5.8 (100:1000 s$^{-1}$) at a weight of magnesium chloride in the slurry of about 0.1 g to about 3.1 at a magnesium chloride weight of 4 g. An increase of weight of magnesium chloride in a slurry can decrease the yield stress of the slurry. The decrease may be exponential. In some examples, the yield stress of the slurry can be about 47 pascal (Pa) at a weight of magnesium chloride in the slurry of about 0.1 g to about 4 Pa at a magnesium chloride weight of 4 g.

Figure 18:
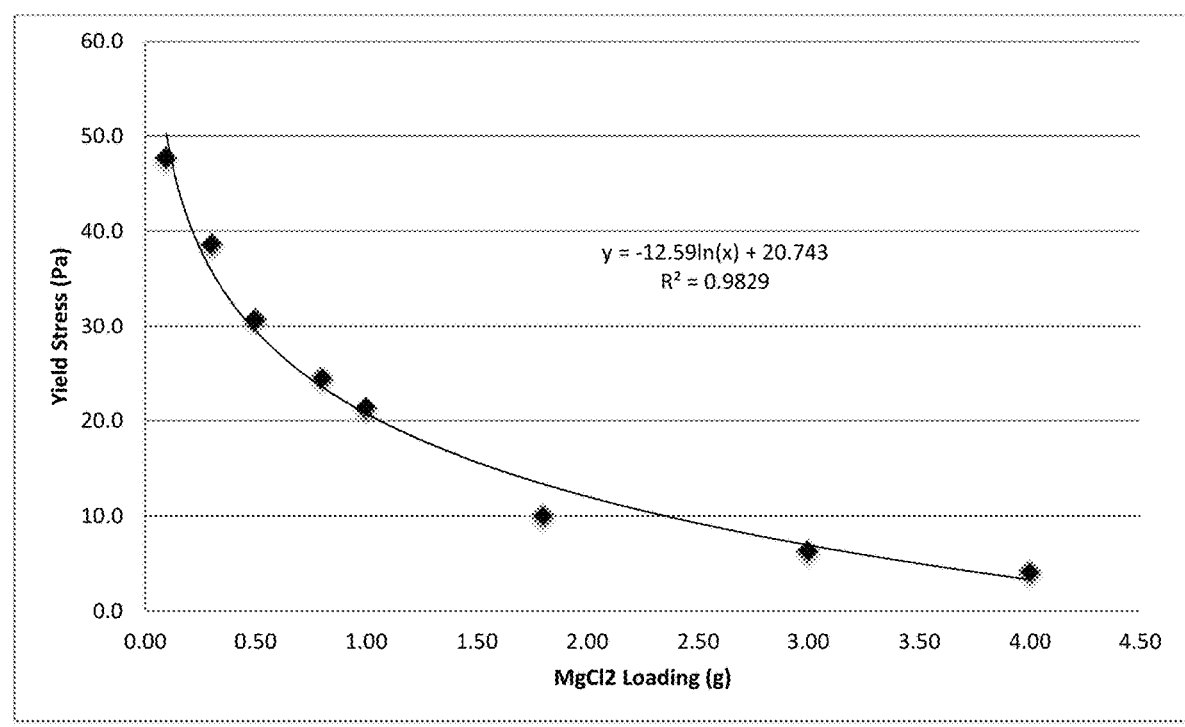
FIG. 18 shows change in yield stress as a result of varying amounts of magnesium chloride for a slurry.

The viscosity of the slurry can be a function of the weight of an activator (e.g. magnesium chloride) in the slurry. FIG. 18 illustrates change in viscosity at a fixed shear rate (1000 s$^{-1}$) as a result of varying amounts of magnesium chloride of a slurry. An increase of magnesium chloride in a slurry can decrease the viscosity of the slurry. The decrease may be exponential. In some examples, the viscosity of the slurry at a shear rate of 1000 s$^{-1}$ can be from about 90 centipoise (cP) at a weight of magnesium chloride in the slurry of about 0.1 g to about 40 cP at a magnesium chloride weight of 4 g.

Physical properties of the slurry can be a function of the amount of activator in the slurry. For example, the yield stress of the slurry can be a function of the weight of magnesium chloride in the slurry. FIG. 18 illustrates change in yield stress as a result of varying amounts of magnesium chloride of a slurry. An increase magnesium chloride in a slurry can decrease the yield of the slurry. The decrease may be exponential. In some examples, the yield stress of the slurry can be about 50 pascal (Pa) at a weight of magnesium chloride in the slurry of about 0.1 g to about 5 Pa at a magnesium chloride weight of 4 g.

Figure 19:
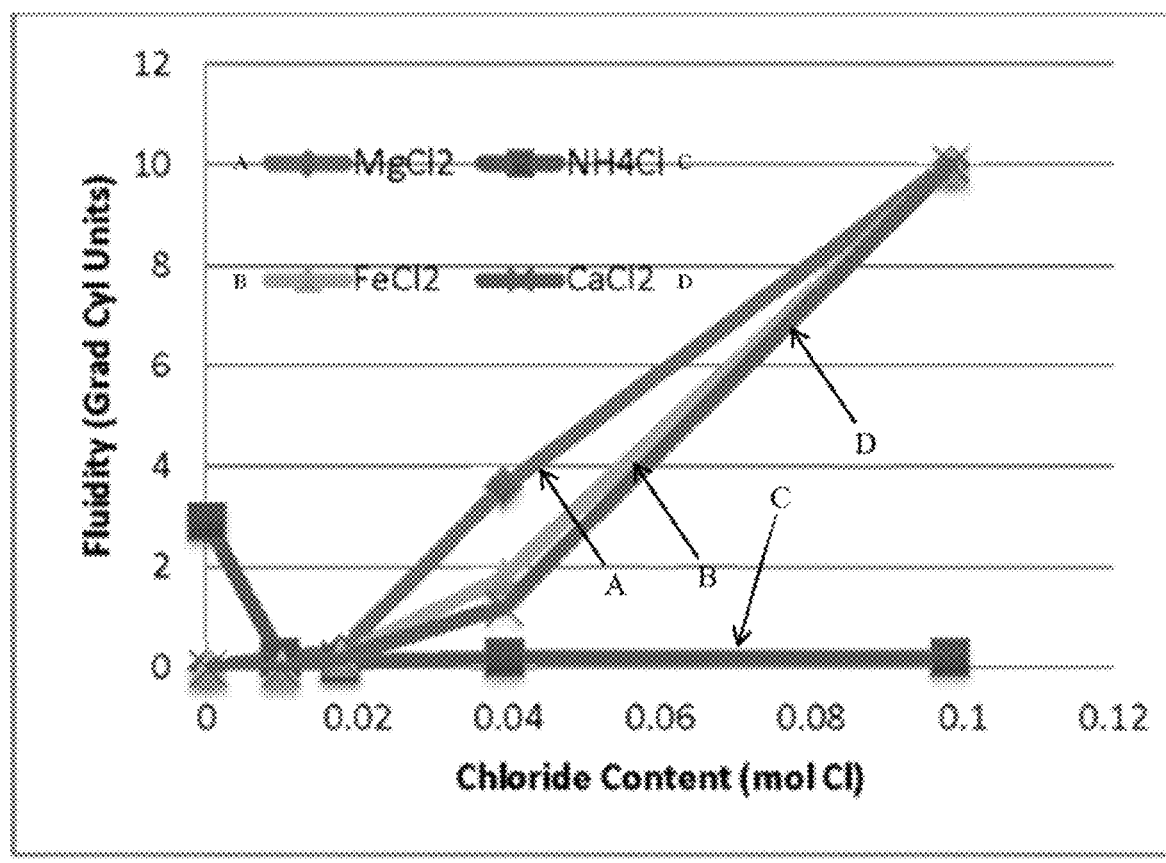
FIG. 19 shows change in fluidity with different chloride sources with varied chloride amounts for a slurry.

FIG. 19 illustrates the results of a tilt test, where change in fluidity with different chloride sources with varied chloride amounts for a slurry is demonstrated. Higher amounts of magnesium chloride, iron chloride, and calcium chloride in a slurry may correspond with increased fluidity of the slurry. In some examples, 0.1 moles of chloride from magnesium chloride, iron chloride, and calcium chloride can correspond to a fluidity of the slurry of about 10 graduated cylinder units. In some examples, higher amounts of ammonium chloride in a slurry may have little change on the fluidity of the slurry, and 0.1 moles of chloride from ammonium chloride can correspond to a fluidity of the slurry of about 0.5 grad cyl units on a ten milliliter cylinder.

Figure 20:
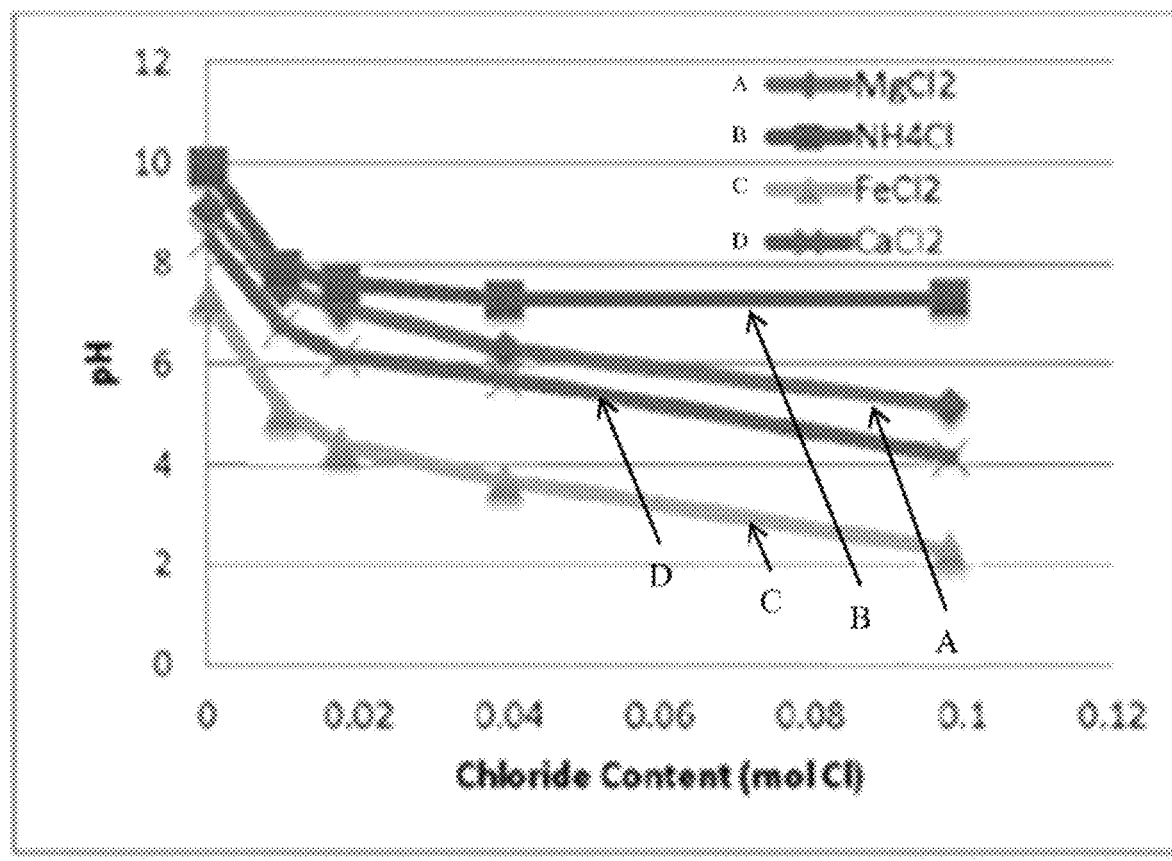
FIG. 20 shows change in pH with different chloride sources with varying amounts of chloride for a slurry.

The pH of a slurry may change as a function of the chloride source used in the slurry. FIG. 20 illustrates change in pH with different chloride sources with varying amounts of chloride for a slurry. Higher amounts of magnesium chloride, ammonium chloride, iron chloride, and calcium chloride in a slurry may correspond with a slight decrease in pH of the slurry. In some examples, 0.1 moles of chloride from magnesium chloride, ammonium chloride, iron chloride, and calcium chloride may correspond to a pH of about 5, 7, 2, and 4, respectively.

Example 10

Figure 21:
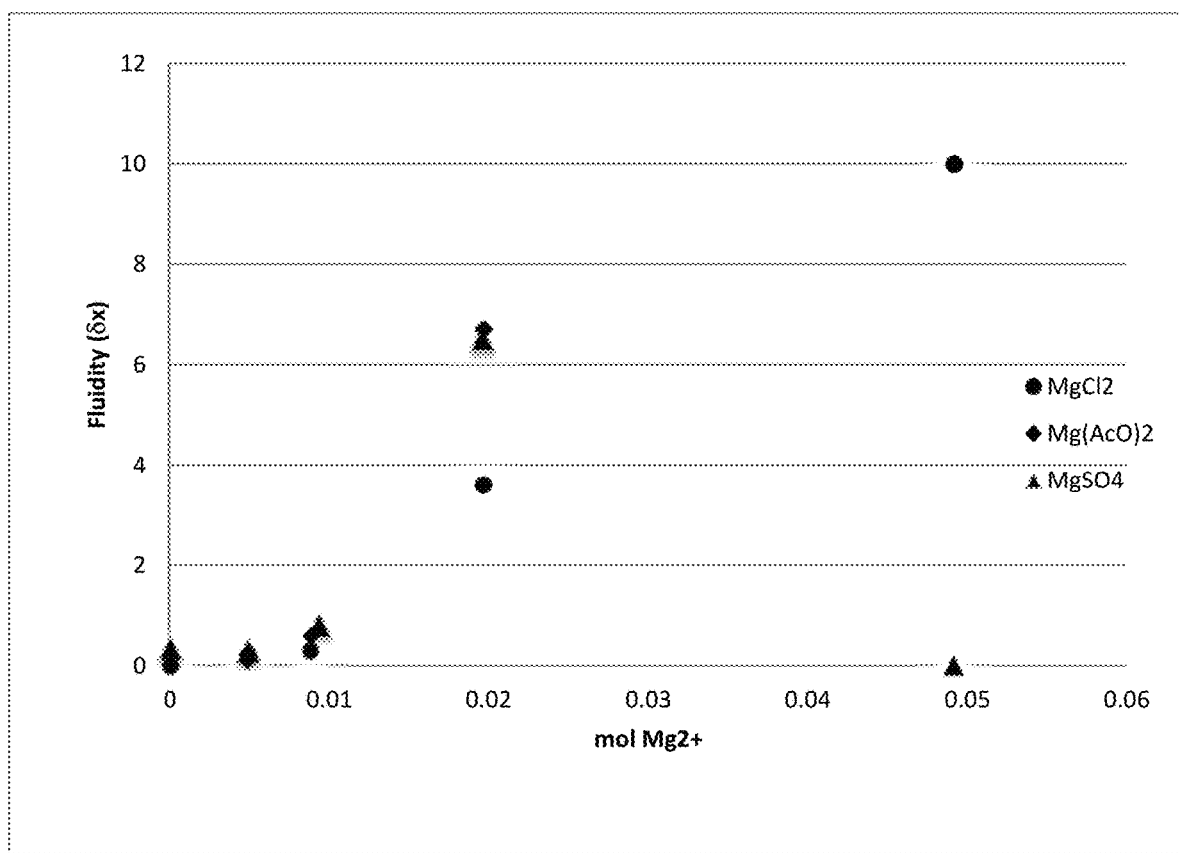
FIG. 21 shows change in fluidity with varying concentrations of magnesium salts for a slurry.

Physical properties of the slurry may be influence by the identity and content of salts that can be added to the slurry. FIG. 21 illustrates change in fluidity with varying concentrations of magnesium salts for a slurry. Tilt tests of slurries were performed. Generally, higher amounts of magnesium salts, such as magnesium chloride, magnesium acetate, and magnesium sulfate, in a slurry may correspond with an increase in fluidity of the slurry. In some examples, 0.02 moles of magnesium in magnesium sulfate and magnesium acetate can correspond to a fluidity of the slurry of about 6 grad cyl units. In some examples, 0.02 moles of magnesium in magnesium chloride can correspond to a fluidity of the slurry of about 4 grad cyl units.

Figure 22:
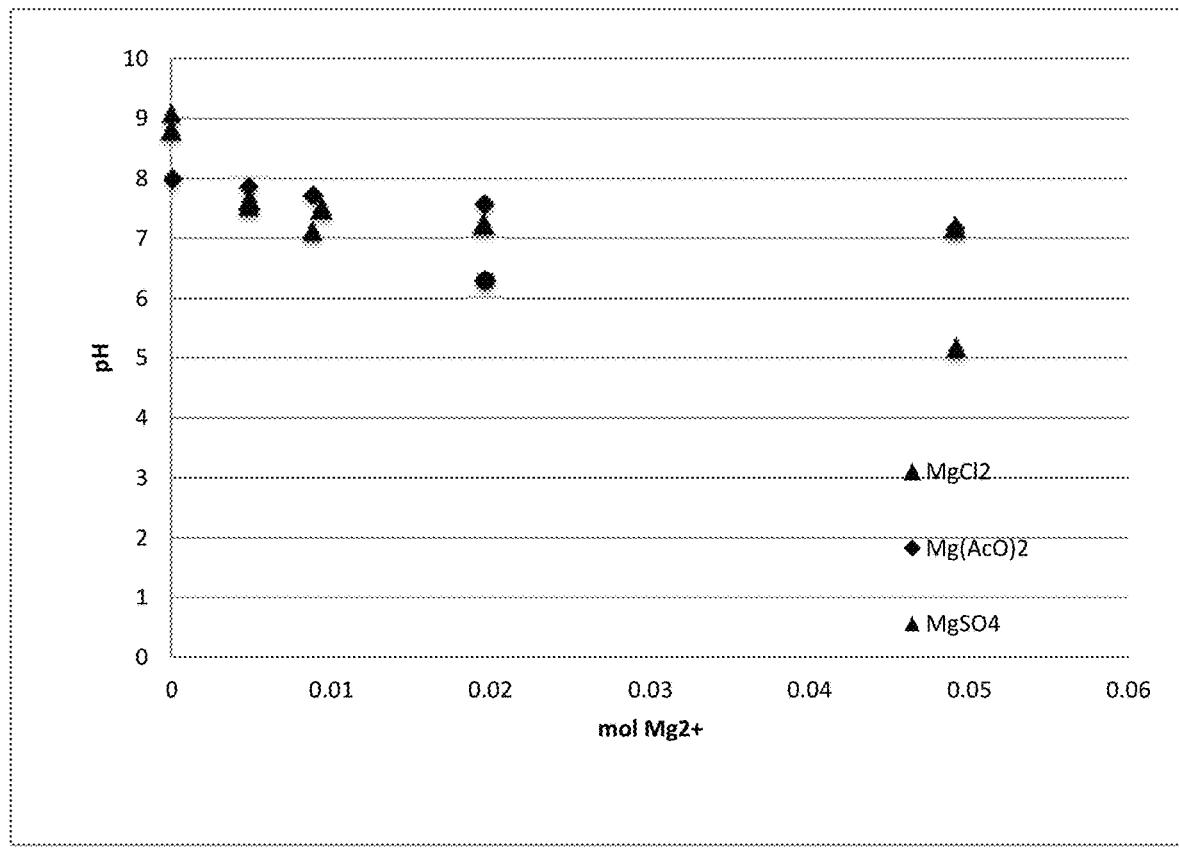
FIG. 22 shows change in pH with various concentrations of magnesium salts for a slurry.

FIG. 22 illustrates change in pH with various concentrations of magnesium salts for a slurry. Generally, higher amounts of magnesium salts, such as magnesium chloride, magnesium acetate, and magnesium sulfate, in a slurry may correspond with a slight decrease in pH of the slurry. The decrease may be exponential. In some examples, 0.02 moles of magnesium from magnesium chloride, magnesium acetate and magnesium sulfate may correspond to a pH of about 7, 7.5, and 6, respectively.

Figure 23:
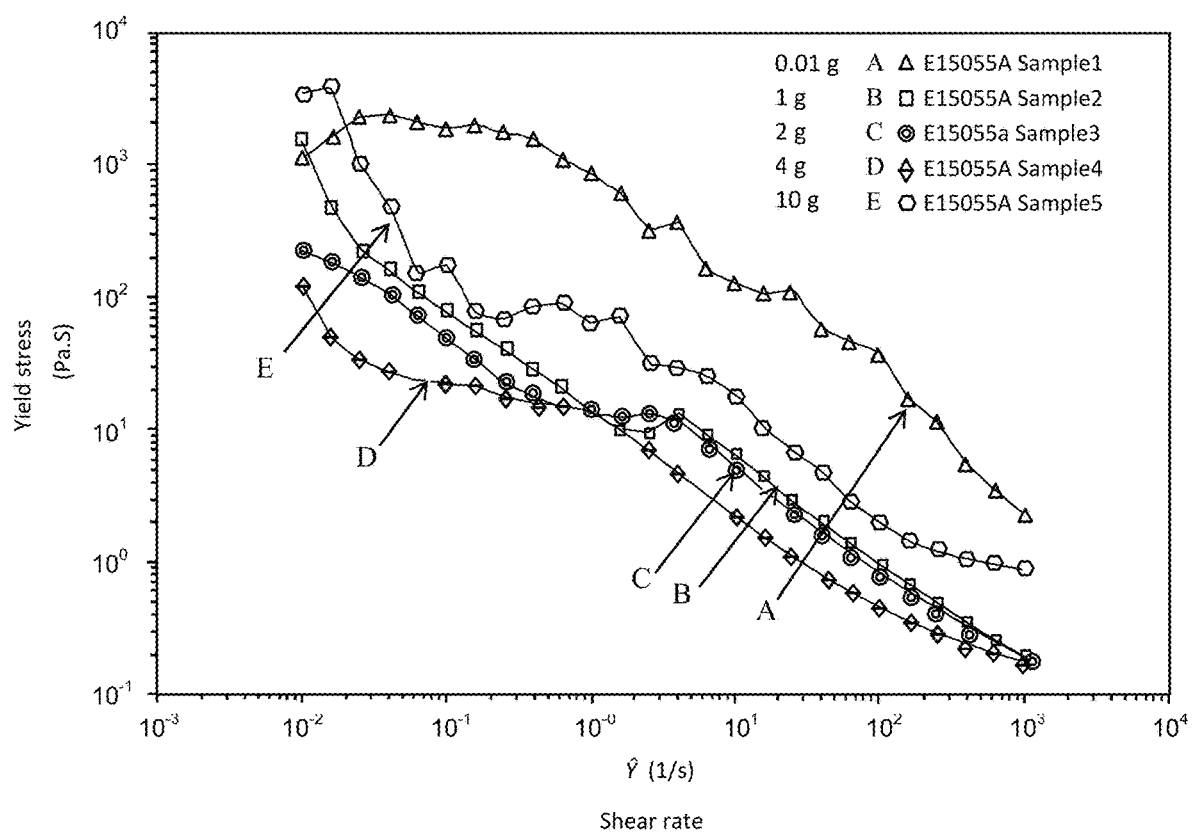
FIG. 23 shows change in yield stress with various concentrations and shear rates of magnesium acetate for a slurry.

FIG. 23 illustrates change in yield stress with various concentrations and shear rates of magnesium acetate for a slurry. The slurry comprises 15 g chromium, 7.5 g alumina, 5.05 g water, and 0.01 g to 10 g of Mg(OAc)$_2$·4H$_2$O. Generally, increasing the shear rate can decrease the yield stress of the slurry. Increasing the amount of magnesium acetate can correspond with a decrease in the yield stress of the slurry until the solubility limit is reached. Monotonic thinning behavior may be observed as more salt is dissolved until the solubility limit is reached. In some examples, the amounts of magnesium acetate in a slurry is about 0.01 g, 1 g, 2 g, 4 g, or 10 g.

Figure 24:
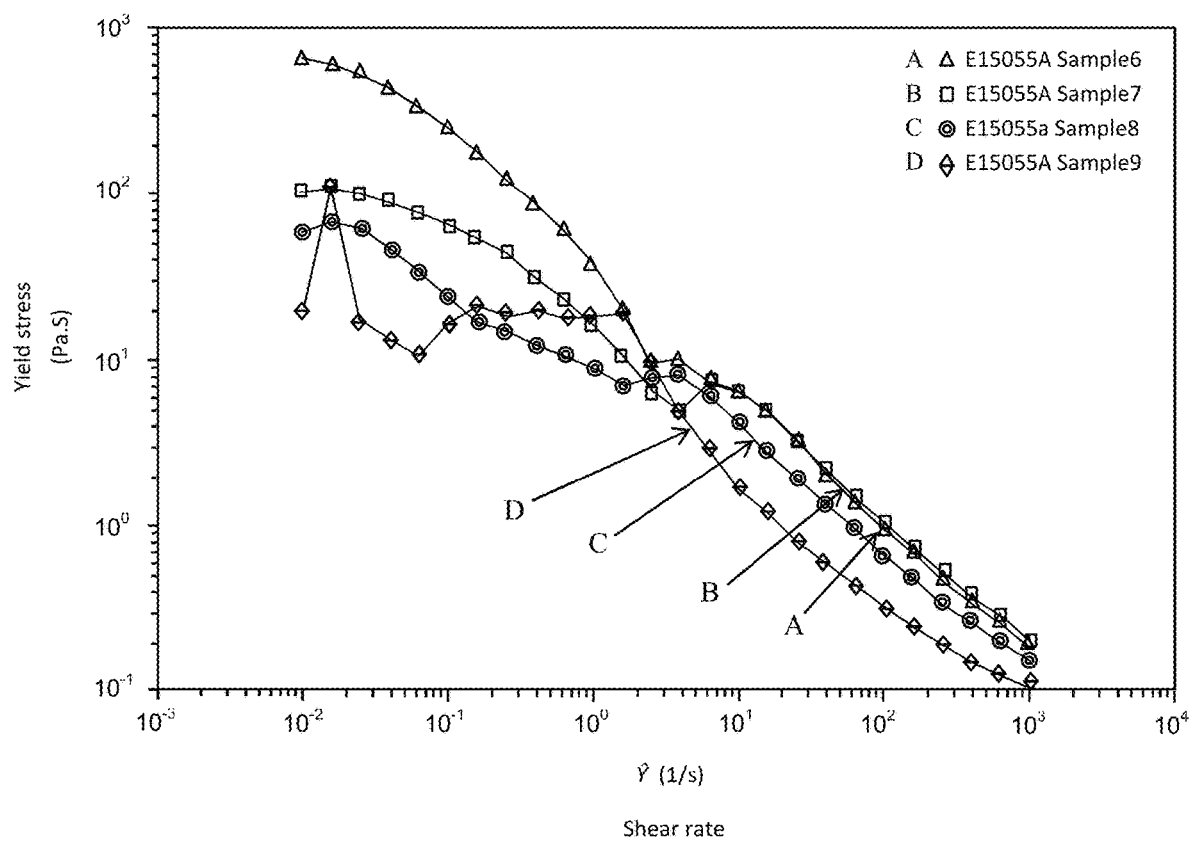
FIG. 24 shows change in yield stress with various concentrations and shear rates of magnesium sulfate for a slurry.

FIG. 24 illustrates change in yield stress with various concentrations and shear rates of magnesium sulfate for a slurry comprising 15 g chromium, 7.5 g alumina, 5.05 g water, and 0.01 g to 10 g of $Mg(OAc)_2·7H_2O$. A decrease in viscosity as a function of increasing salt is observed. Monotonic thinning behavior may be observed as more salt is dissolved until the solubility limit is reached. 0.0018 g to 0.8000 g $MgSO_4$ per gram of water in the slurry was used to prepare samples 6-9.

FIG. 25 illustrates change in pH, viscosity, and yield stress with various magnesium salts across a range of concentrations of salts for a slurry.

Properties of the slurry, such as pH, viscosity, and yield stress) may be influence by the identity and content of salts that can be added to the slurry. FIG. 26 illustrates change in pH, viscosity, and yield stress with various salts across a range of concentrations of salts for a slurry. Though not wishing to be bound by mechanistic theory, cationic valency might directly influence slurry rheology and ionic strength of salts may not predict slurry rheology. Monovalent acetate salts may be beneficial for target green strength properties. Monovalent salt slurry viscosities might be time dependent at low concentrations. Though not wishing to be bound by mechanistic theory, dibasic aluminum acetate may be added to benefit and remove apparent yield stress in high alumina loading slurries and may demonstrate good cohesion but poor adhesion in green strength tests. The slurry comprises 15 g chromium, 7.5 g alumina, 5.05 g water, and a varying amount of salt, wherein, #1 refers to 0.1 mmol of salt, #2 refers to 5 mmol of salt, #3 refers to 9 mmol of salt, #4 refers to 20 mmol of salt, and #5 refers to 49 mmol of salt.

Figure 27:
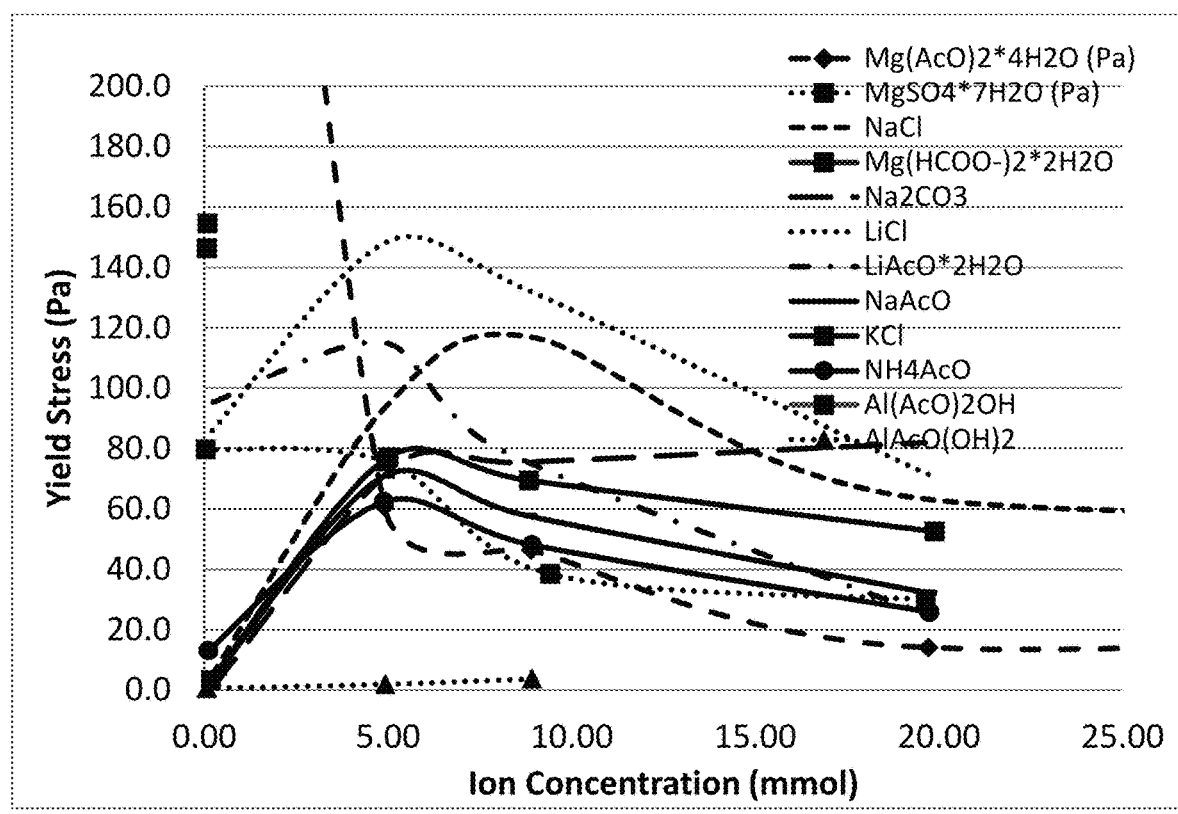
FIG. 27 shows change in yield stress as result of various concentrations of ions for a slurry.

FIG. 27 illustrates change in yield stress as result of various concentrations of ions in a slurry. Generally, magnesium salts initially have high yield stresses and then demonstrate thinning. Generally, monovalent salts demonstrate thickening upon addition of more salt before slight thinning at even higher concentrations. Generally, trivalent salts and dibasic aluminum acetate show little to no yield stress at a solution concentration.

Materials, devices, systems and methods herein, including material compositions (e.g., material layers), can be combined with or modified by other materials, devices, systems and methods, including material compositions, such as, for example, those described in U.S. Patent Publication No. 2013/0171471; U.S. Patent Publication No. 2013/0309410; U.S. Patent Publication No. 2013/0252022; U.S. Patent Publication No. 2015/0167131; and U.S. Patent Publication No. 2015/0345041, each of which is incorporated herein by reference in its entirety.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for forming at least one layer of stainless steel comprising at least one transition metal, comprising:
a substrate; and
a slurry adjacent to said substrate, wherein said slurry comprises: (i) a solvent; (ii) an alloying agent, wherein said alloying agent comprises said at least one transition metal, and wherein said alloying agent is configured to diffuse into said substrate; (iii) a metal halide activator that facilitates diffusion of said at least one transition metal into said substrate; and (iv) an inert species that aids in dispersing said alloying agent in said solvent, wherein said inert species has a particle size that is less than or equal to about 200 mesh, wherein said slurry does not comprise an organic binder, and wherein said metal halide activator does not comprise an ammonium group, wherein said slurry is configured to form said at least one stainless steel layer upon diffusion of said at least one transition metal into said substrate, wherein said stainless steel layer comprises said at least one transition metal, wherein said slurry has a viscosity between 10 centiPoise (cP) and 100 cP at a shear rate of 1000 per second ($s^{-1}$).

2. The system of claim 1, wherein a particle size of said alloying agent is greater than said particle size of said inert species.

3. The system of claim 1, wherein said particle size of said alloying agent is less than about 140 mesh.

4. The system of claim 1, wherein said alloying agent is selected from the group consisting of iron, chromium, nickel, vanadium, titanium, tungsten, molybdenum, cobalt, manganese, zirconium, niobium and combinations thereof.

5. The system of claim 1, wherein said at least one transition metal is selected from the group consisting of chromium, nickel, vanadium, titanium, tungsten, molybdenum, cobalt, manganese, zirconium, niobium and combinations thereof.

6. The system of claim 1, wherein said metal halide activator is selected from the group consisting of magnesium chloride ($MgCl_2$), iron (II) chloride ($FeCl_2$), calcium chloride ($CaCl_2$)), zirconium (IV) chloride ($ZrCl_4$), titanium (IV) chloride ($TiCl_4$), niobium (V) chloride ($NbCl_5$), titanium (III) chloride ($TiCl_3$), vanadium (III) chloride ($VCl_3$), chromium (III) chloride ($CrCl_3$), manganese (II) chloride ($MnCl_2$), chromium (II) chloride ($CrCl_2$), cobalt (II) chloride ($CoCl_2$), copper (II) chloride ($CuCl_2$), nickel (II) chloride ($NiCl_2$), vanadium (II) chloride ($VCl_2$), and combinations thereof.

7. The system of claim 1, wherein said metal halide activator is hydrated.

8. The system of claim 1, wherein a molar ratio of said metal halide activator to said at least one transition metal is at most about 10:1.

9. The system of claim 1, wherein said substrate comprises steel.

10. The system of claim 1, wherein said at least one transition metal comprises chromium.

11. The system of claim 1, wherein said slurry has a viscosity of between about 200 centipoise (cP) and about 10,000 cP at a shear rate between 1 per second ($s^{-1}$) and 100 $s^{-1}$.

12. The system of claim 1, wherein said metal halide activator is configured to be a binder in absence of a solvent.

13. The system of claim 1, wherein the yield stress of the slurry is between 10 Pascals (Pa) and 100 Pa.

14. The system of claim 1, wherein the pH of the slurry is between 3 and 12.

15. The system of claim 14, wherein the slurry has a pH between 5 and 8.

16. The system of claim 1, wherein settling rate of the slurry is stable to sedimentation for greater than 1 minute.

17. The system of claim 16, wherein the settling rate of the slurry is stable to sedimentation for greater than 15 minutes.

* * * * *